US012586380B2

(12) United States Patent
Kim et al.

(10) Patent No.: US 12,586,380 B2
(45) Date of Patent: Mar. 24, 2026

(54) IMAGE ANALYSIS DEVICE, IMAGE ANALYSIS METHOD FOR TELECOMMUTING WORK SECURITY AND TERMINAL DEVICE INCLUDING THE SAME

(71) Applicant: SAMSUNG ELECTRONICS CO., LTD., Suwon-si (KR)

(72) Inventors: Jaemyun Kim, Suwon-si (KR); Eunkyung Kim, Suwon-si (KR); Dayun Kang, Suwon-si (KR); Byeongjoon Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 18/593,318

(22) Filed: Mar. 1, 2024

(65) Prior Publication Data

US 2024/0420472 A1 Dec. 19, 2024

(30) Foreign Application Priority Data

Jun. 14, 2023 (KR) ........................ 10-2023-0075925

(51) Int. Cl.
*G06V 20/52* (2022.01)
*G06T 3/40* (2024.01)
*G06T 7/00* (2017.01)
*G06V 40/16* (2022.01)

(52) U.S. Cl.
CPC ................ *G06V 20/52* (2022.01); *G06T 3/40* (2013.01); *G06T 7/00* (2013.01); *G06V 40/172* (2022.01); *G06V 2201/07* (2022.01)

(58) Field of Classification Search
CPC .. G06V 20/52; G06V 40/172; G06V 2201/07; G06V 40/20; G06T 3/40; G06T 7/00; G06T 2207/10016; G06F 21/50; G06F 21/31
See application file for complete search history.

(56) References Cited

U.S. PATENT DOCUMENTS

| | | | |
|---|---|---|---|
| 8,370,639 B2 | 2/2013 | Azar et al. | |
| 8,994,499 B2 | 3/2015 | Zhao et al. | |
| 2016/0239723 A1* | 8/2016 | Ge ........................ | G06V 20/52 |

(Continued)

FOREIGN PATENT DOCUMENTS

| | | |
|---|---|---|
| CN | 111708913 A | 9/2020 |
| CN | 112783650 A | 5/2021 |

(Continued)

*Primary Examiner* — Jared Walker
(74) *Attorney, Agent, or Firm* — Sughrue Mion, PLLC

(57) ABSTRACT

An image analysis device includes: an image converter configured to generate target image frames based on video image frames captured by a terminal device; a plurality of image analyzers respectively comprising a plurality of image analysis models, the plurality of image analyzers being configured to: generate a plurality of analysis results by analyzing the target image frames respectively using the plurality of image analysis models different from each other, and perform a respective independent analysis scheduling regardless of analysis execution states of other image analyzers; and a security state determiner configured to determine a security mode of the terminal device based on the plurality of analysis results.

19 Claims, 21 Drawing Sheets

100

(56)        References Cited

U.S. PATENT DOCUMENTS

| | | | |
|---|---|---|---|
| 2017/0084067 A1* | 3/2017 | Son | G06T 11/60 |
| 2018/0082436 A1* | 3/2018 | Hattori | G06T 1/60 |
| 2018/0232592 A1* | 8/2018 | Stewart | G08B 13/19606 |
| 2019/0066488 A1* | 2/2019 | Locke | G05D 1/0276 |
| 2019/0244498 A1* | 8/2019 | Dumas | G08B 13/19656 |
| 2020/0233621 A1* | 7/2020 | Ishikura | G06F 21/608 |
| 2020/0311440 A1* | 10/2020 | Bamba | G06V 10/50 |
| 2020/0349359 A1* | 11/2020 | Hadas | G06F 21/36 |
| 2021/0073524 A1* | 3/2021 | Boyer | G06V 10/62 |
| 2021/0166514 A1* | 6/2021 | Boyes | G07C 9/00563 |
| 2021/0240851 A1* | 8/2021 | Badalone | H04W 4/029 |
| 2023/0140505 A1* | 5/2023 | Amato | G06F 18/21 |
| | | | 382/103 |
| 2023/0238149 A1* | 7/2023 | Nakano | G08B 21/02 |

FOREIGN PATENT DOCUMENTS

| | | |
|---|---|---|
| KR | 10-1595882 B1 | 2/2016 |
| KR | 10-1782339 B1 | 10/2017 |
| KR | 10-2020-0118524 A | 10/2020 |
| KR | 10-2021-0112495 A | 9/2021 |
| KR | 10-2336224 B1 | 12/2021 |

* cited by examiner

FIG. 2

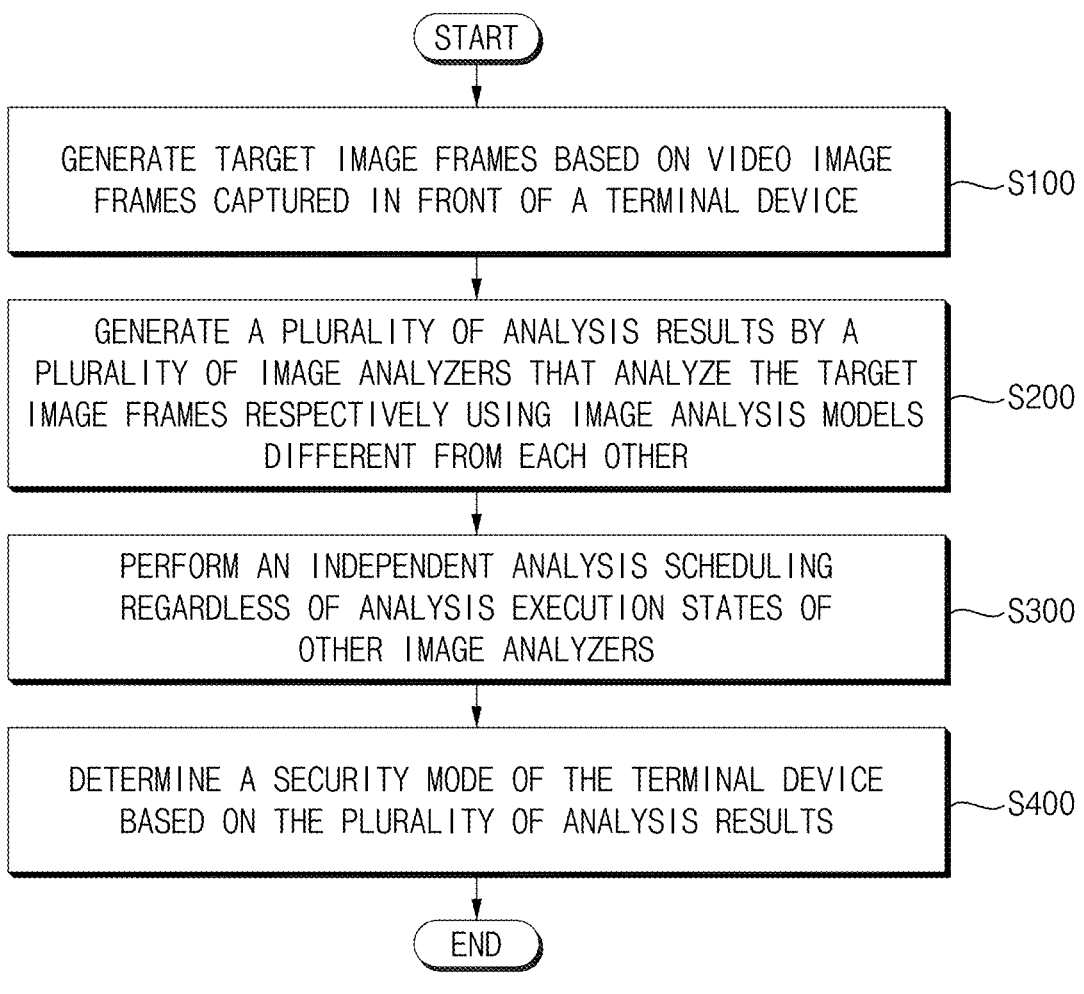

START

GENERATE TARGET IMAGE FRAMES BASED ON VIDEO IMAGE
FRAMES CAPTURED IN FRONT OF A TERMINAL DEVICE ～S100

GENERATE A PLURALITY OF ANALYSIS RESULTS BY A
PLURALITY OF IMAGE ANALYZERS THAT ANALYZE THE TARGET
IMAGE FRAMES RESPECTIVELY USING IMAGE ANALYSIS MODELS
DIFFERENT FROM EACH OTHER ～S200

PERFORM AN INDEPENDENT ANALYSIS SCHEDULING
REGARDLESS OF ANALYSIS EXECUTION STATES OF
OTHER IMAGE ANALYZERS ～S300

DETERMINE A SECURITY MODE OF THE TERMINAL DEVICE
BASED ON THE PLURALITY OF ANALYSIS RESULTS ～S400

END

FIG. 15A
FIG. 15B

IFS  CMS  ⋯
BSS
PRCS  MEMS  SMON

40
CNET

1002

CAM  DIS  CMT  IFT
PRCT  MEMT  SEC
⋯
BST
⋯

FIG. 20

IMAGE ANALYSIS DEVICE, IMAGE ANALYSIS METHOD FOR TELECOMMUTING WORK SECURITY AND TERMINAL DEVICE INCLUDING THE SAME

CROSS-REFERENCE TO RELATED APPLICATION

This application is based on and claims priority under 35 U.S.C. § 119 to Korean Patent Application No. 10-2023-0075925, filed on Jun. 14, 2023, in the Korean Intellectual Property Office, the disclosure of which is incorporated by reference herein in its entirety.

BACKGROUND

1. Field

The disclosure relates to semiconductor integrated circuits, and more particularly, to an image analysis device, an image analysis method for telecommuting work security and a terminal device including the image analysis device.

2. Discussion of the Related Art

With the development of information technology (IT), the frequency of remote working or home working is increasing due to the change of the work environments such as the spread of various infectious diseases. However, the remote work or the telecommuting work is difficult for workers who handle security data such as company trade secrets or personal information. In the remote work environments, the risk of leakage of the security data is high, thus a monitoring method for such leakage of sensitive information is required. To solve this problem, security methods have been developed to prevent unauthorized leakage such as copying or printing of the security data, in the remote working environments treating the security data.

SUMMARY

Provided are an image analysis device and an image analysis method capable of efficiently maintaining real-time security in telecommuting work environments, and a terminal device including the image analysis device.

According to an aspect of the disclosure, an image analysis device includes: an image converter configured to generate target image frames based on video image frames captured by a terminal device; a plurality of image analyzers respectively comprising a plurality of image analysis models, the plurality of image analyzers being configured to: generate a plurality of analysis results by analyzing the target image frames respectively using the plurality of image analysis models different from each other, and perform a respective independent analysis scheduling regardless of analysis execution states of other image analyzers; and a security state determiner configured to determine a security mode of the terminal device based on the plurality of analysis results.

According to an aspect of the disclosure, an image analysis method includes: generating target image frames based on video image frames captured by a terminal device; generating a plurality of analysis results by a plurality of image analyzers respectively comprising a plurality of image analysis models, the plurality of image analyzers analyzing the target image frames respectively using the plurality of image analysis models different from each other; performing a respective independent analysis scheduling regardless of analysis execution states of other image analyzers; and determining a security mode of the terminal device based on the plurality of analysis results.

According to an aspect of the disclosure, a terminal device includes: a display device; a camera configured to generate video image frames captured by the display device; an image analysis device configured to determine a security mode based on the video image frames; and a security module configured to, based on the security mode, restrict a display of security data through the display device, the image analysis device including: an image converter configured to generate target image frames based on the video image frames; a plurality of image analyzers respectively comprising a plurality of image analysis models and configured to: generate a plurality of analysis results by analyzing the target image frames respectively using the plurality of image analysis models different from each other, and perform a respective independent analysis scheduling regardless of analysis execution states of other image analyzers; and a security state determiner configured to determine the security mode of the terminal device based on the plurality of analysis results.

According to example embodiments, the image analysis device and the image analysis method may improve analysis speed through parallel analysis using the plurality of image analyzers and efficiently provide telecommuting work environments of seamless security through independent analysis scheduling of the plurality of image analyzers.

BRIEF DESCRIPTION OF DRAWINGS

Example embodiments of the present disclosure will be more clearly understood from the following detailed description taken in conjunction with the accompanying drawings:

FIG. 2 is a flowchart illustrating an image analysis method according to example embodiments;

FIGS. 7 and 8 are timing diagrams illustrating an independent analysis scheduling of a plurality of image analyzers included in an image analysis device according to example embodiments;

FIG. 9 is a timing diagram illustrating a synchronized analysis scheduling of a plurality of image analyzers;

FIGS. 11 and 12 are diagrams for describing examples of a neural network structure that is driven by an image analysis device according to example embodiments;

FIGS. 15A through 15D are examples of a target image frame to be analyzed;

FIGS. 18 and 19 are diagrams illustrating telecommuting work environments including an image analysis device according to example embodiments; and FIG. 20 is a diagram illustrating display of security data depending on operation modes in an image analysis method according to example embodiments.

DETAILED DESCRIPTION

Figure 1:
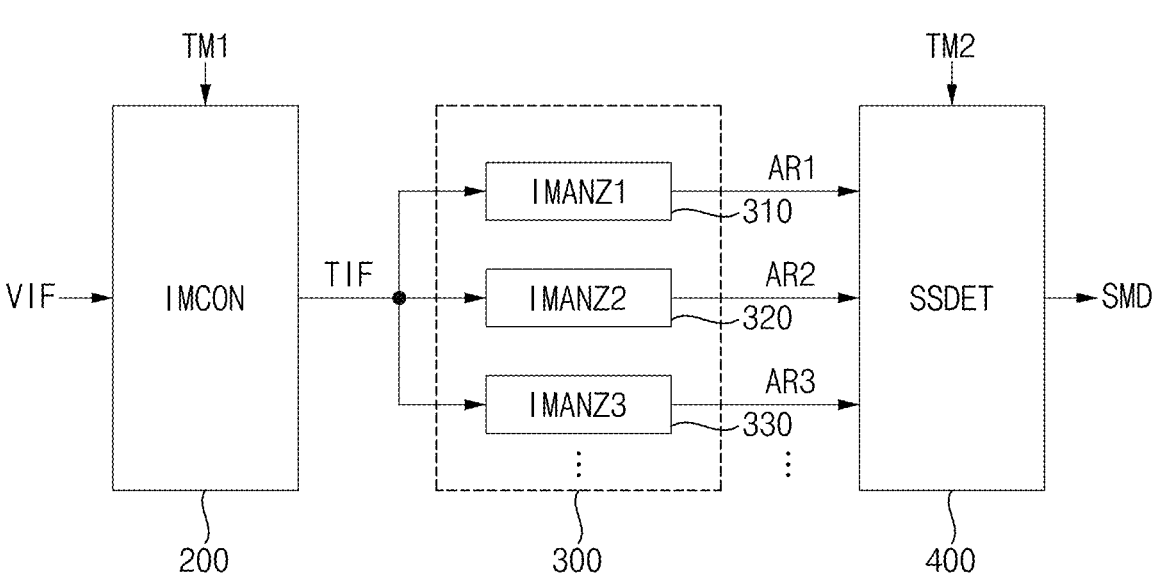
FIG. 1 is a block diagram illustrating an image analysis device according to example embodiments.

Example embodiments will be described more fully hereinafter with reference to the accompanying drawings, in which some example embodiments are shown. In the drawings, like numerals refer to like elements throughout. The repeated descriptions may be omitted.

The embodiments may be described and illustrated in terms of blocks, as shown in the drawings, which carry out a described function or functions. These blocks, which may be referred to herein as a storage, a receiver, a sampler, a scaler, a format converter, a security state determiner or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

According to an embodiment of the disclosure, "module" or "portion" may be implemented by a processor and memory. "Processor" is interpreted broadly in a way that includes general-purpose processors, central processing units (CPUs), microprocessors, digital signal processors (DSPs), controllers, microcontrollers, state machines, etc. In some contexts, "processor" can refer to application-specific semiconductors (ASICs), programmable logic devices (PLDs), field-programmable gate arrays (FPGAs), etc. "Processor" means a combination of processing devices, such as a combination of DSP and microprocessor, a combination of multiple microprocessors, a combination of more than one microprocessor and DSP core, or any other such configuration. In addition, "memory" should be interpreted broadly in a way that includes any electronic component capable of storing electronic messages. "Memory" means various types of processor-readable media such as random access memory (RAM), read-only memory (ROM), non-volatile memory (NVRAM), programmable read-only memory (PROM), erasable plannable read-only memory (EPROM), electronically erasable rewritable read-only memory (EEPROM), cache, magnetic or optical data storage device, buffer and so on. If the processor is able to read messages from and/or write messages to memory, the memory is said to be in electronic communication with the processor. The memory integrated in the processor is in an electronic communication state with the processor.

In this disclosure, "image" may include at least one image taken by a camera including surrounding photographs, videos, snapshots, etc. or at least one image taken continuously in time. The "image frame" may include an image taken by a camera or generated by the composite of at least two images taken by more than one camera in different directions.

In this disclosure, "authorized user" may generally refer to a user who has permission to process security data including trade secrets, personal information, etc. "unauthorized user" and "user" may refer to a user who does not have the right to process security data including trade secrets, personal information, etc.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Terms used in the present disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure cannot be interpreted to exclude embodiments of the present disclosure.

In one or more embodiments of the disclosure described below, a hardware approach is described as an example. However, since the one or more embodiments of the disclosure include technology that uses both hardware and software, the various embodiments of the present disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

FIG. 1 is a block diagram illustrating an image analysis device according to example embodiments, and FIG. 2 is a flowchart illustrating an image analysis method according to example embodiments.

In FIG. 1, an image analysis device 100 may include an image converter IMCON 200, a plurality of image analyzers 300 and a security state determiner SSDET 400.

The image analysis device 100 may perform a function of monitoring the security status of a terminal device in a telecommuting or remote work environment as will be described below with reference to FIGS. 16A and 16B. The image analysis device 100 may determine a security mode of the terminal device based on the results of image analysis. For example, the terminal device may be set to either a locked state or an unlocked state according to the security mode determined by the image analysis device 100.

The remote work environment may be, for example, an environment in which a user works from home, studies online, holds an online meeting, or takes an online exam through the terminal device.

Terminal devices include, for example, a smart phone, a portable terminal, a mobile terminal, a foldable terminal, a personal computer, a laptop computer, and a tablet PC, a wearable device (e.g., including a watch type terminal (smartwatch), a glass type terminal (smart glass), a head mounted display (HMD), etc.), and a smart TV.

The image analysis device 100 may be implemented with hardware, software, firmware, or a combination thereof. Depending on embodiments, as will be described below with reference to FIGS. 18 and 19, the image analysis device 100 may be included in the terminal device or may be implemented outside the terminal device.

Referring to FIGS. 1 and 2, the image converter 200 may generate target image frames TIF based on video image frames VIF captured by a terminal device (S100). The video image frames VIF may be transferred to the image analysis device 100 from a camera that photographs or captures a front of the terminal device by a constant capturing period such as 30 frames per second (FPS) or 60 FPS. The image converter 200 may generate the target image frames TIF periodically by a constant sampling period determined based on a first timing control signal TM1.

The plurality of image analyzers 300 may generate a plurality of analysis results by analyzing the target image frames TIF respectively using image analysis models different from each other (S200). The image analysis models may be determined in various ways depending on the security policy of the telecommuting work environment. Example embodiments of the image analysis models will be described below with reference to FIGS. 10A, 10B, and 10C.

FIG. 1 shows, as an example, three image analyzers, that is, a first image analyzer IMANZ1 310, a second image analyzer IMANZ2 320, and a third image analyzer IMANZ3 330, but embodiments are not limited thereto. Depending on embodiments, the number of image analyzers may be determined in various ways.

The first image analyzer 310 may generate a first analysis result AR1 by analyzing the target image frames TIF using a first image analysis model. The second image analyzer 320 may generate a second analysis result AR2 by analyzing the target image frames TIF using a second image analysis model. The third image analyzer 330 may generate a third analysis result AR3 by analyzing the target image frames TIF using a third image analysis model.

The plurality of image analyzers 300 may perform an independent analysis scheduling regardless of analysis execution states of other image analyzers (S300). Here, "analysis execution state" may refer to a busy state in which the image analyzer is currently performing an analysis operation on a previously received target image frame, or a ready state in which the image analyzer has completed an analysis operation on a previously received target image frame and is waiting for an analysis operation on the next target image frame. "Independent analysis scheduling" indicates that each image analyzer determines the scheduling of its own analysis operation regardless of the busy state or the ready state of other image analyzers and regardless of the analysis results of other image analyzers.

The security state determiner 400 may determine a security mode SMD of the terminal device based on the plurality of analysis results AR1, AR2 and AR4 (S400). The security state determiner 400 may determine the security mode SMD of the terminal device periodically by a constant analysis period determined based on a second timing control signal TM2. In other words, the security state determiner 400 may periodically determine the security mode SMD, regardless of the times required for analysis by the plurality of image analyzers 300. In some example embodiments, as will be described below with reference to FIGS. 14 through 15D, the security state determiner 400 may determine the security mode SMD to be one of a normal mode, a security threat mode, and a judgment-deferred mode.

The sampling period of the image converter 200 and the analysis period of the security state determiner 400 may be determined according to the security policy of the remote work environment. The first timing control signal TM1 and the second timing control signal TM2 may be provided by an internal circuit of a device or system including the image analysis device 100. The first timing control signal TM1 and the second timing control signal TM2 may be provided in the form of control values representing each period or may be provided in the form of pulse signals that are periodically activated according to each period. In some embodiments, the first timing control signal TM1 and the second timing control signal TM2 may be the same. In other words, the above-described sampling period and analysis period may be the same. In some embodiments, the first timing control signal TM1 and the second timing control signal TM2 may be different from each other. In other words, the above-described sampling period and analysis period may be different from each other. In this case, the sampling period may be set to be shorter than the analysis period.

As such, the image analysis device 100 and the image analysis method according to example embodiments may improve analysis speed through parallel analysis using the plurality of image analyzers 300 and efficiently provide telecommuting work environments of seamless security through the independent analysis scheduling of the plurality of image analyzers 300.

Figures 3, 4:
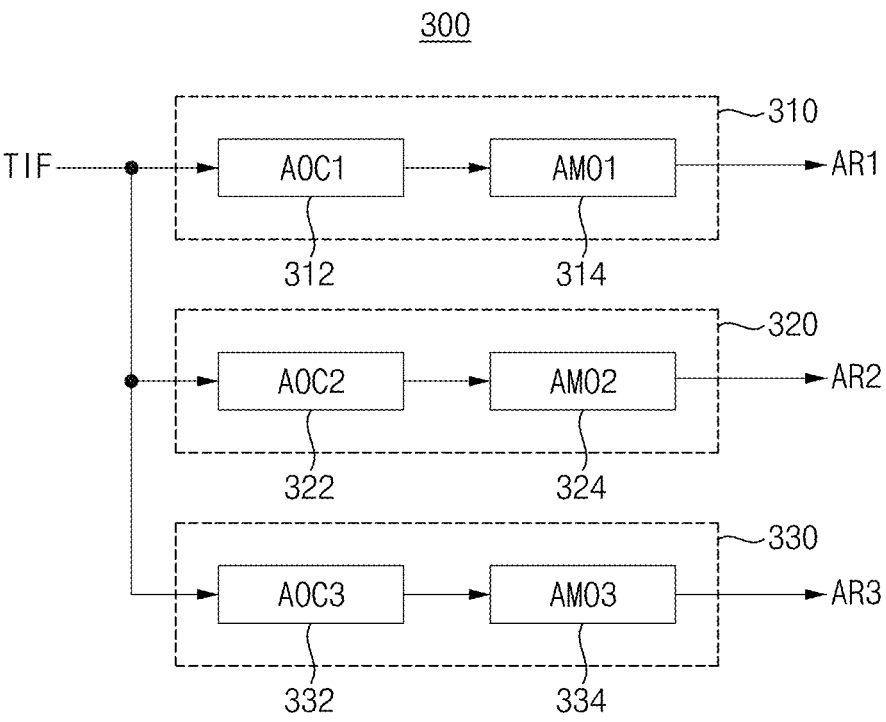
FIG. 3 is a block diagram illustrating a plurality of image analyzers included in an image analysis device according to example embodiments.
FIG. 4 is a diagram illustrating an example embodiment of an image analyzer included in an image analysis device according to example embodiments.

FIG. 3 is a block diagram illustrating a plurality of image analyzers included in an image analysis device according to example embodiments.

In FIG. 3, each image analyzer of the plurality of image analyzers 300 may include an analysis operation controller and an analysis model operator. The analysis model operator may generate an analysis result by analyzing a target image frame using an image analysis model. The analysis operation controller may control an analysis scheduling of the analysis model operator based on an analysis execution state of the analysis model operator.

A first image analyzer 310 may include a first analysis operation controller AOC1 312 and a first analysis model operator AMO1, 314. The first analysis model operator 314 may generate a first analysis result AR1 by analyzing a received target image frame TIF using a first image analysis model. The first analysis operation controller 312 may control the analysis scheduling of the first analysis model operator based on the analysis execution state of the first analysis model operator 314.

A second image analyzer 320 may include a second analysis operation controller AOC2 322 and a second analysis model operator AMO2 324. The second analysis model operator 324 may generate a second analysis result AR2 by analyzing a received target image frame TIF using a second image analysis model. The second analysis operation controller 322 may control analysis scheduling of the second analysis model operator 324 based on the analysis execution state of the second analysis model operator 324.

A third image analyzer 330 may include a third analysis operation controller AOC3 332 and a third analysis model operator AMO3 334. The third analysis model operator 334 may generate a third analysis result AR3 by analyzing a received target image frame TIF using a third image analysis model. The third analysis operation controller 332 may control analysis scheduling of the third analysis model operator 334 based on the analysis execution state of the third analysis model operator 334.

FIG. 4 is a diagram illustrating an example embodiment of an image analyzer included in an image analysis device according to example embodiments.

In FIG. 4, an image analyzer 350 may include an analysis operation controller AOC 352 and an analysis model operator AMO 354. Each of the plurality of image analyzers 310, 320 and 330 of FIG. 3 may have the configuration of FIG. 4 except that each image analysis model is different.

The analysis model operator 354 may include an analysis model executor AMEXE 356 that executes each image analysis model to generate each analysis result, and a result storage ARSTR 358 that stores each analysis result. The result storage 358 may include a first storage REG1 that stores a most recent analysis result with respect to a target image frame that is received previously the analysis model operator 354, and a second storage REG2 that stores an analysis result with respect to a target image frame that is analyzed presently by the analysis model operator.

The analysis model operator may provide status information STI indicating whether the analysis model executor 356 is in a busy state or a ready state to the analysis operation controller 352. The busy state indicates that the analysis model executor 356 is currently performing an analysis operation on a previously received target image frame. The ready state indicates that the analysis model executor 356 has been completed the analysis operation on the previously received target image frame and are waiting for the analysis operation on the next target image frame.

The analysis operation controller 352 may control the analysis scheduling of the analysis model operator 354 such that the analysis model operator 354 may omit an analysis of a target image frame that is received from the image converter 200 in FIG. 1 before the image analyzer 350 completes an analysis of a previous target image frame.

In an example embodiment, the analysis operation controller 352 may perform the analysis scheduling of the analysis model operator 354 based on status information STI indicating the analysis execution state of the analysis model operator, that is, the status information STI indicating the busy state or the ready state. When the analysis model operator 354 is in the ready state in which the analysis of the previously received target image frame has been completed, the analysis operation controller 352 may transfer the target image frame from the image convertor 200 to the analysis model operator 354. On the other hand, when the analysis model operator 354 is in the busy state in which analysis of the previously received target image frame has not been completed, the analysis operation controller 352 may not transfer target image frame received from the image convertor 200 to the analysis model operator 354. In other words, the analysis operation controller 352 may control the analysis scheduling of the analysis model operator 354 such that the analysis model operator 354 may omit an analysis of the target image frame that is received from the image converter before the image analyzer 350 completes the analysis of the previous target image frame. The control of the independent analysis scheduling of each image analyzer 350 will be described in more detail below with reference to FIGS. 7 and 8.

Figure 5:
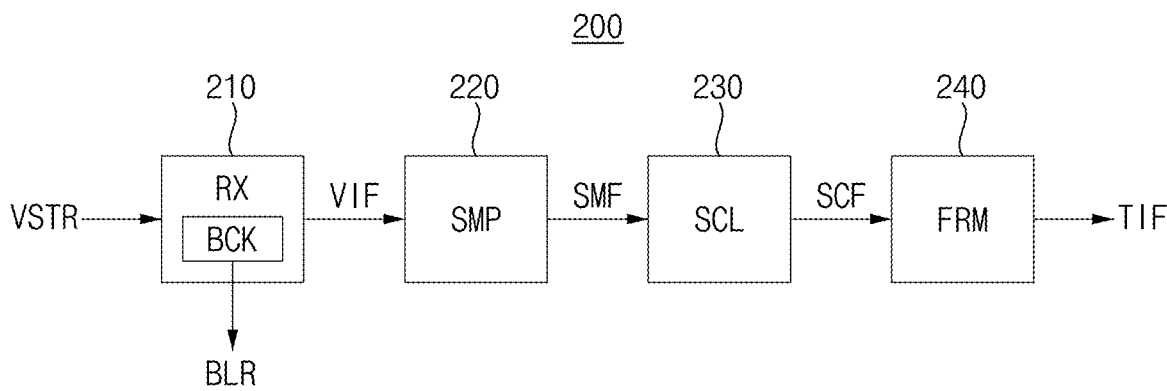
FIG. 5 is a block diagram illustrating an example embodiment of an image converter included in an image analysis device according to example embodiments.

FIG. 5 is a block diagram illustrating an example embodiment of an image converter included in an image analysis device according to example embodiments.

In FIG. 5, an image converter 200 may include a receiver RX 210, a sampler SMP 220, a scaler SCL 230, and a format converter FRM 240.

The receiver 210 may receive a video stream VSTR and obtain video image frames VIF included in the video stream VSTR. The video stream VSTR may include video image frames VIF by a constant frame rate or a capturing period, such as 30 frames per second (FPS), 60 FPS, and so on.

The sampler 220 may sample the video image frames VIF and output sample image frames SMF periodically by a constant sampling period. The sampler 220 may sample the video stream VSTR by a frame rate corresponding to the sampling period. In image analysis to monitor telecommuting security threats, a speed of approximately 1.43 FPS (1 image per about 700 ms) or higher is required, and the sampling period may be appropriately determined depending on the security policy.

The scaler 230 may generate scaled image frames SCF by adjusting the size of the sampled image frames SMF. The scaler 230 may adjust the size of the frame to match the input size of the plurality of image analyzers 300 described above. For example, when the resolutions required for image analysis of each image analysis model in the plurality of image analyzers 300 are 1280×720, 640×480, and 640×640, respectively, and the input sampled image frames SMF are 1920×1080, through pixel subsampling and linear interpolation, etc., a scale transformation that matches the input requirements of each image analysis model may be performed.

The format converter 240 may generate the target image frames TIB that are to be analyzed by converting the format of the scaled image frames SCF. The format converter 240 may convert the format of scaled image frames SCF into a format required by each image analysis model of the plurality of image analyzers 300.

In an example embodiment, the image converter 200 may further include an image quality checker BCK that detects the degree of blurriness of target image frames VIF and provides a blurriness value BLR indicating the blurriness of the target image frames TIF. The blurriness value BLR may be provided to the security state determiner 400 of FIG. 1, and the security state determiner 400 may determine the security mode SMD by referring to the blurriness value BLR. FIG. 5 shows that the image quality checker BCK is included in the receiver 210, but embodiments are not limited thereto.

Figure 6:
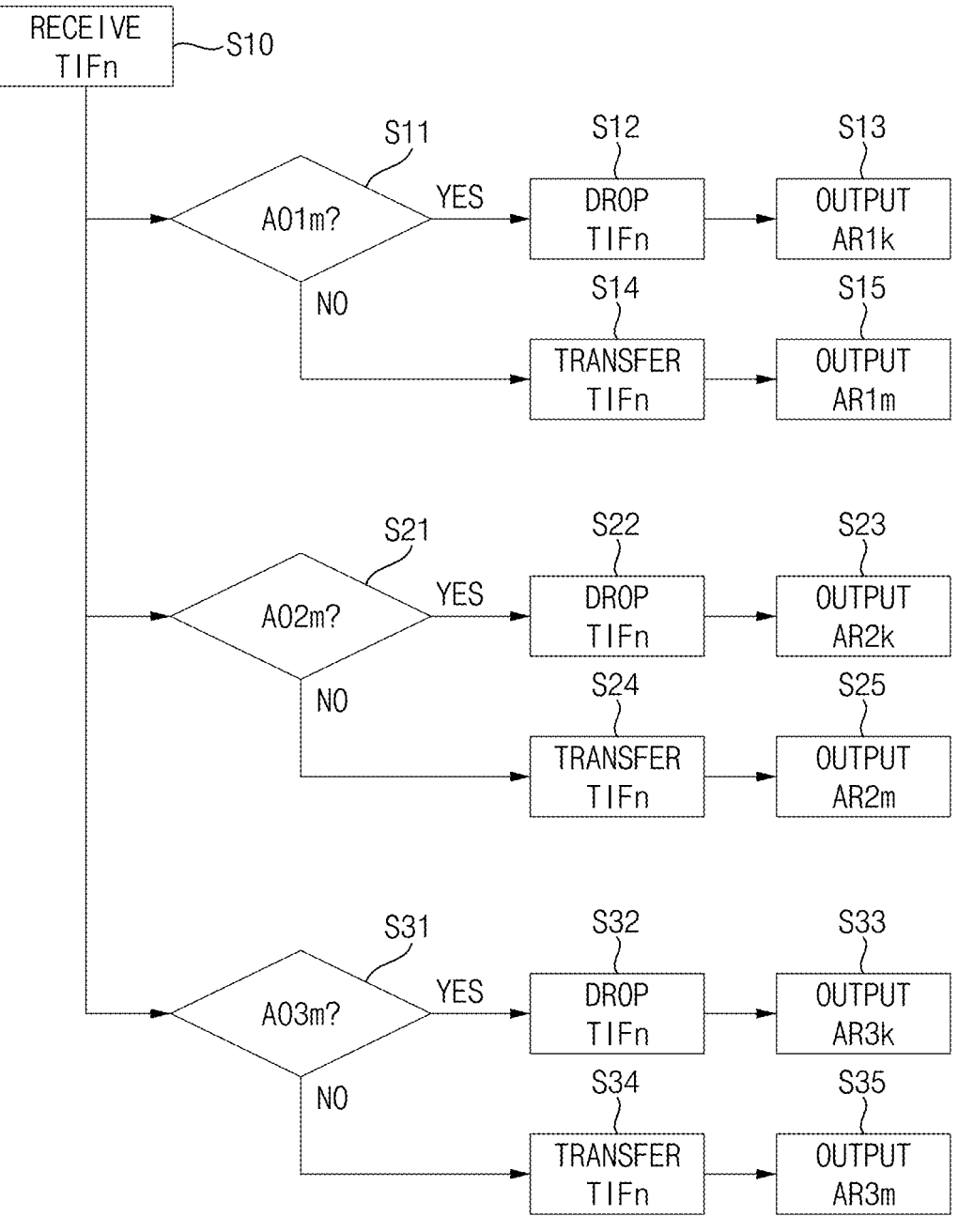
FIG. 6 is a flowchart illustrating an independent analysis scheduling of a plurality of image analyzers included in an image analysis device according to example embodiments.

FIG. 6 is a flowchart illustrating an independent analysis scheduling of a plurality of image analyzers included in an image analysis device according to example embodiments.

Referring to FIGS. 3 through 6, the first image analyzer 310, the second image analyzer 320, and the third image analyzer 330 may receive a target image frame TIFn currently provided from the image converter 200 (S10).

The first image analyzer 310, the second image analyzer 320, and the third image analyzer 330 may perform a respective independent analysis scheduling based on their own analysis execution states regardless of the analysis execution states (e.g., the busy state or the ready state) of other image analyzers.

When the first analysis model operator 314 is in the busy state in which the analysis operation AO1$m$ on the previously received target image frame TIF1$m$ has not yet been completed (S11: YES), the first analysis operation controller 312 may drop the currently received target image frame TIFn without transferring the currently received target image frame TIFn to the first analysis model operator 314 (S12). In this case, the first image analyzer 310 may output the analysis result AR1$k$ with respect to the target image frame TIF1$k$, for which the analysis was completed before the target image frame TIF1$m$, to the security state determiner 400 (S13).

When the first analysis model operator 314 is in the ready state in which the first analysis model operator 314 has completed the analysis operation AO1$m$ on the previously received target image frame TIF1$m$ (S11: NO), the first analysis operation controller 312 may transfer the currently received target image frame TIFn to the first analysis model operator 314 (S14), and the first analysis model operator 314 may initiate an analysis operation on the target image frame TIFn. In this case, the first image analyzer 310 may output the analysis result AR1$m$ with respect to the target image frame TIF1$m$, for which analysis has been completed, to the security state determiner 400 (S15).

When the second analysis model operator 324 is in the busy state in which the analysis operation AO2$m$ on the previously received target image frame TIF2$m$ has not yet been completed (S21: YES), the second analysis operation controller 322 may drop the currently received target image frame TIFn without transferring the currently received target image frame TIFn to the second analysis model operator 324 (S22). In this case, the second image analyzer 320 may output the analysis result AR2$k$ with respect to the target image frame TIF2$k$, for which the analysis was completed before the target image frame TIF2$m$, to the security state determiner 400 (S23).

When the second analysis model operator 324 is in the ready state in which the second analysis model operator 324 has completed the analysis operation AO2$m$ on the previously received target image frame TIF2$m$ (S21: NO), the second analysis operation controller 322 may transfer the currently received target image frame TIFn to the second analysis model operator 324 (S24), and the second analysis model operator 324 may initiate an analysis operation on the target image frame TIFn. In this case, the second image analyzer 320 may output the analysis result AR2$m$ with respect to the target image frame TIF2$m$, for which analysis has been completed, to the security state determiner 400 (S25).

When the third analysis model operator 334 is in the busy state in which the analysis operation AO3$m$ on the previously received target image frame TIF3$m$ has not yet been completed (S31: YES), the third analysis operation controller 332 may drop the currently received target image frame TIFn without transferring the currently received target image frame TIFn to the third analysis model operator 334 (S32). In this case, the third image analyzer 330 may output the analysis result AR3$k$ with respect to the target image frame TIF3$k$, for which the analysis was completed before the target image frame TIF3$m$, to the security state determiner 400 (S33).

When the third analysis model operator 334 is in the ready state in which the third analysis model operator 334 has completed the analysis operation AO3$m$ on the previously received target image frame TIF3$m$ (S31: NO), the third analysis operation controller 332 may transfer the currently received target image frame TIFn to the third analysis model operator 334 (S34), and the third analysis model operator 334 may initiate an analysis operation on the target image frame TIFn. In this case, the third image analyzer 330 may output the analysis result AR3$m$ with respect to the target image frame TIF3$m$, for which analysis has been completed, to the security state determiner 400 (S35).

As such, each of the plurality of image analyzers 310, 320 and 330 may perform the independent analysis scheduling, as will be described in more detail below with reference to FIGS. 7 and 8, and provide the analysis result, which is generated the most recently, periodically by the constant analysis period to the security state determiner 400.

Figure 7:
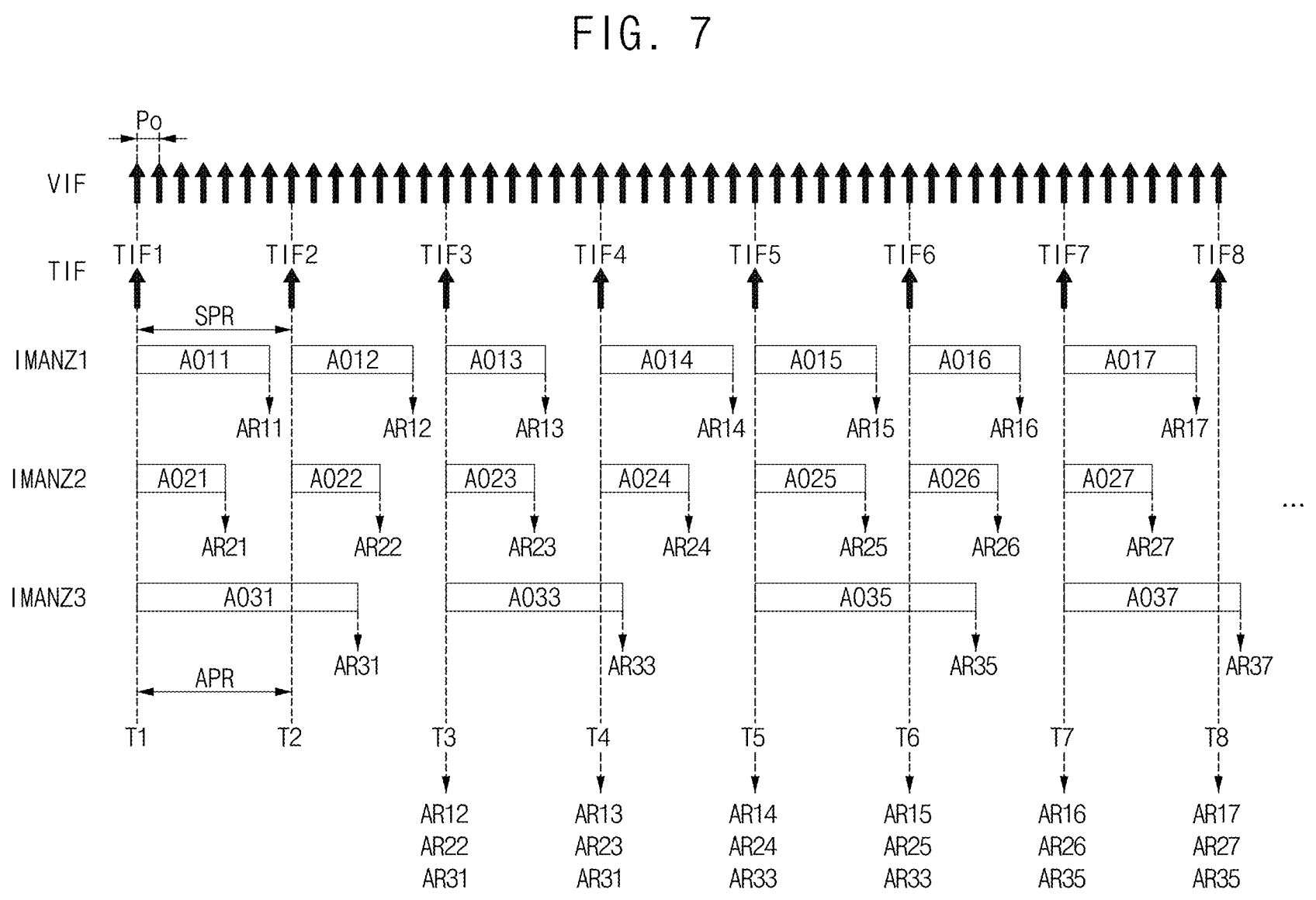
Figure 8:
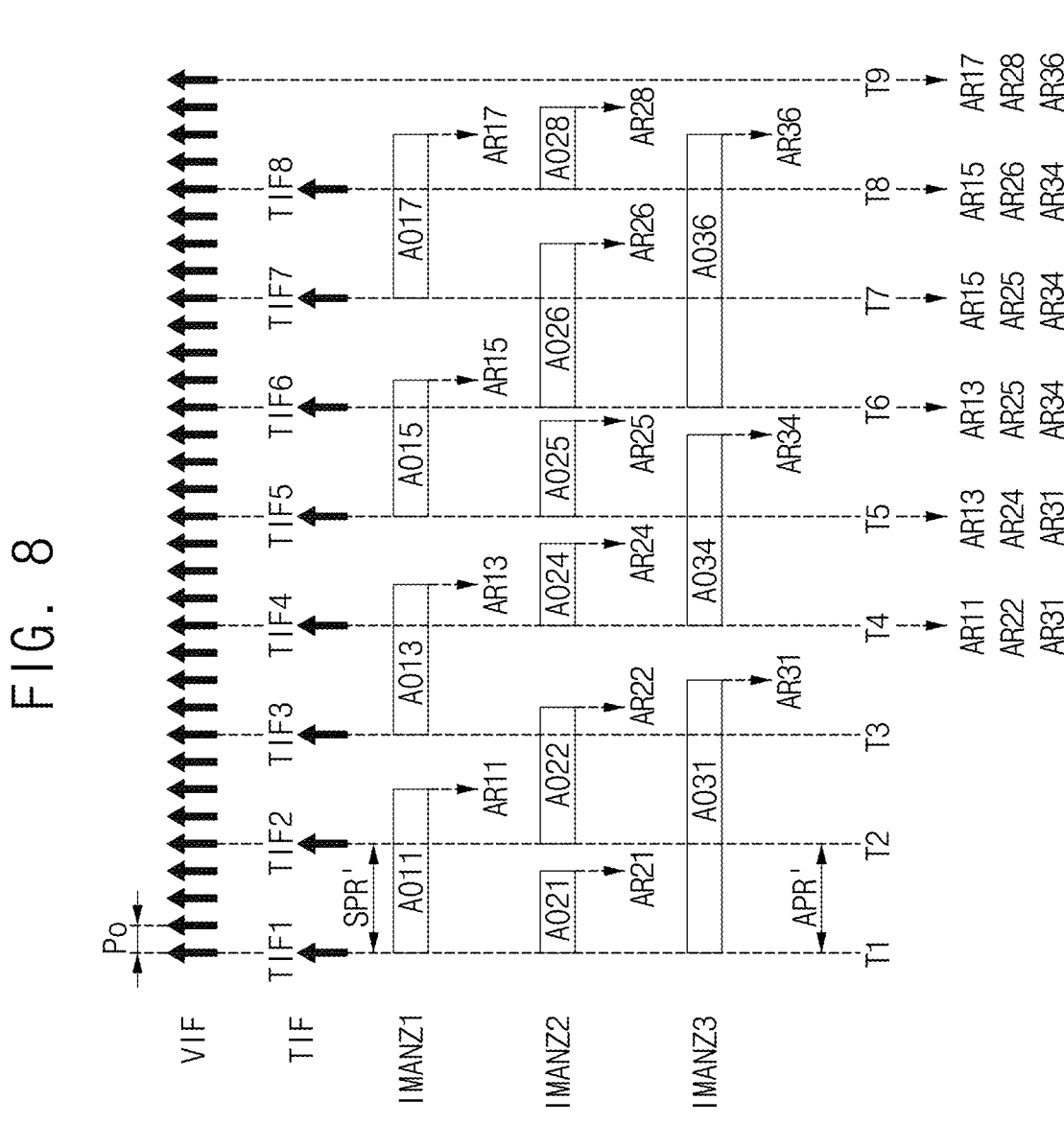

FIGS. 7 and 8 are timing diagrams illustrating an independent analysis scheduling of a plurality of image analyzers included in an image analysis device according to example embodiments.

In FIG. 7, arrows represent each image frame, Po represents the image capturing period of a camera, SPR represents the sampling period of the above-described image converter 200, and APR represents the analysis period of the above-described security state determiner 400. FIG. 7 shows an example embodiment in which the sampling period SPR and analysis period APR are the same, but the sampling period SPR and analysis period APR may be different depending on embodiments. IMANZi represents the i-th image analyzer, AOij represents the analysis operation on the j-th target image frame TIFj performed by the i-th image analyzer IMANZi, and ARij represents the analysis result of the analysis operation AOij.

In FIG. 7, the analysis operation AO11 of the first image analyzer IMANZ1, the analysis operation AO21 of the second image analyzer IMANZ2 and the analysis operation AO31 of the third image analyzer IMANZ3 with respect to the first target image frame TIF1 may start at the first time point T1.

Before the second time point T2, the analysis operation AO11 of the first image analyzer IMANZ1 and the analysis operation AO21 of the second image analyzer IMANZ2 for the first target image frame TIF1 may be completed, and the corresponding analysis results AR11 and AR21 may be generated. Accordingly, the first image analyzer IMANZ1 and the second image analyzer IMANZ2 in the ready state at the second time point T2 may initiate analysis operations AO12 and AO22 on the second target image frame TIF2.

At the second time point T2, the third image analyzer IMANZ3 does not complete the analysis operation AO31 on the first target image frame TIF1, and the third image analyzer IMANZ3 in the busy state may drop the second target image frame TIF2 received at the second time point2

T2, and the analysis operation on the second target image frame TIF2 may be omitted by the third image analyzer IMANZ3.

Before the third time point T3, the analysis operation AO12 of the first image analyzer IMANZ1 and the analysis operation AO22 of the second image analyzer IMANZ2 on the second target image frame TIF2 may be completed, and the corresponding analysis results AR12 and AR22 may be generated. In addition, before the third time point T3, the analysis operation AO31 of the third image analyzer IMANZ3 on the first target image frame TIF1 may be completed and the corresponding analysis result AR31 may be generated. Accordingly, the first image analyzer IMANZ1, the second image analyzer IMANZ2 and the third image analyzer IMANZ3 in the ready state at the third time point T3 may initiate analysis operations AO13, AO23 and AO33 on the third target image frame TIF3.

In this way, each of the plurality of image analyzers IMANZ1, IMANZ2 and IMANZ3 may omit the analysis of the target image frame received from the image converter while the analysis of the previously received target image frame is not completed.

The plurality of image analyzers IMANZ1, IMANZ2 and IMANZ3 may provide the most recently generated analysis results to the security state determiner 400 periodically by a constant analysis period APR. As shown in FIG. 7, the most recently generated analysis results AR12, AR22 and AR31 at the third time point T3 are provided to the security state determiner 400, the most recently generated analysis results AR13, AR23, AR31 at the fourth time point T4 are provided to the security state determiner 400, the most recently generated analysis results AR14, AR24, AR35 at the fifth time point T5 are provided to the security state determiner 400, the most recently generated analysis results AR15, AR25, AR33 at the sixth time point T6 are provided to the security state determiner 400, the most recently generated analysis results AR16, AR26, AR35 at the seventh time point T7 are provided to the security state determiner 400, and the most recently generated analysis results AR17, AR27, AR35 at the eighth time point T8 are provided to the security state determiner 400.

As a result, the security state determiner 400 of FIG. 1 may determine the security mode SMD periodically by the analysis period APR regardless of the times required for analysis of the plurality of image analyzers IMANZ1, IMANZ2 and IMANZ3.

FIG. 8 shows an example embodiment in which an analysis period APR' shorter than the analysis period APR of FIG. 7 and a sampling period SPR' shorter than the sampling period SPR of FIG. 7 are applied. Hereinafter, descriptions repeated with FIG. 7 may be omitted.

In FIG. 8, the independent analysis scheduling may be applied as described with reference to FIG. 7, and the plurality of image analyzers IMANZ1, IMANZ2 and IMANZ3 may provide the most recently generated analysis results, periodically by the analysis period APR', to the security state determiner 400. As shown in FIG. 8, the most recently generated analysis results AR11, AR22, AR31 at the fourth time point T4 are provided to the security state determiner 400, the most recently generated analysis results AR13, AR24, AR31 at the fifth time point T5 are provided to the security state determiner 400, the most recently generated analysis results AR13, AR25, AR34 at the sixth time point T6 are provided to the security state determiner 400, the most recently generated analysis results AR15, AR25, AR34 at the seventh time point T7 are provided to the security state determiner 400, the most recently generated analysis results AR15, AR26, AR35 at the eighth time point T8 are provided to the security state determiner 400, and the most recently generated analysis results AR17, AR28, AR36 at the ninth time point T9 are provided to the security state determiner 400.

As described with reference to FIGS. 7 and 8, regardless of the relatively long analysis cycle APR and the relatively short analysis cycle APR', the image analysis device 100 according to example embodiments may determine the security mode periodically by performing the independent analysis scheduling for each image analyzer and using the most recent analysis results, regardless of the times required for analysis of the plurality of image analyzers.

Figure 9:
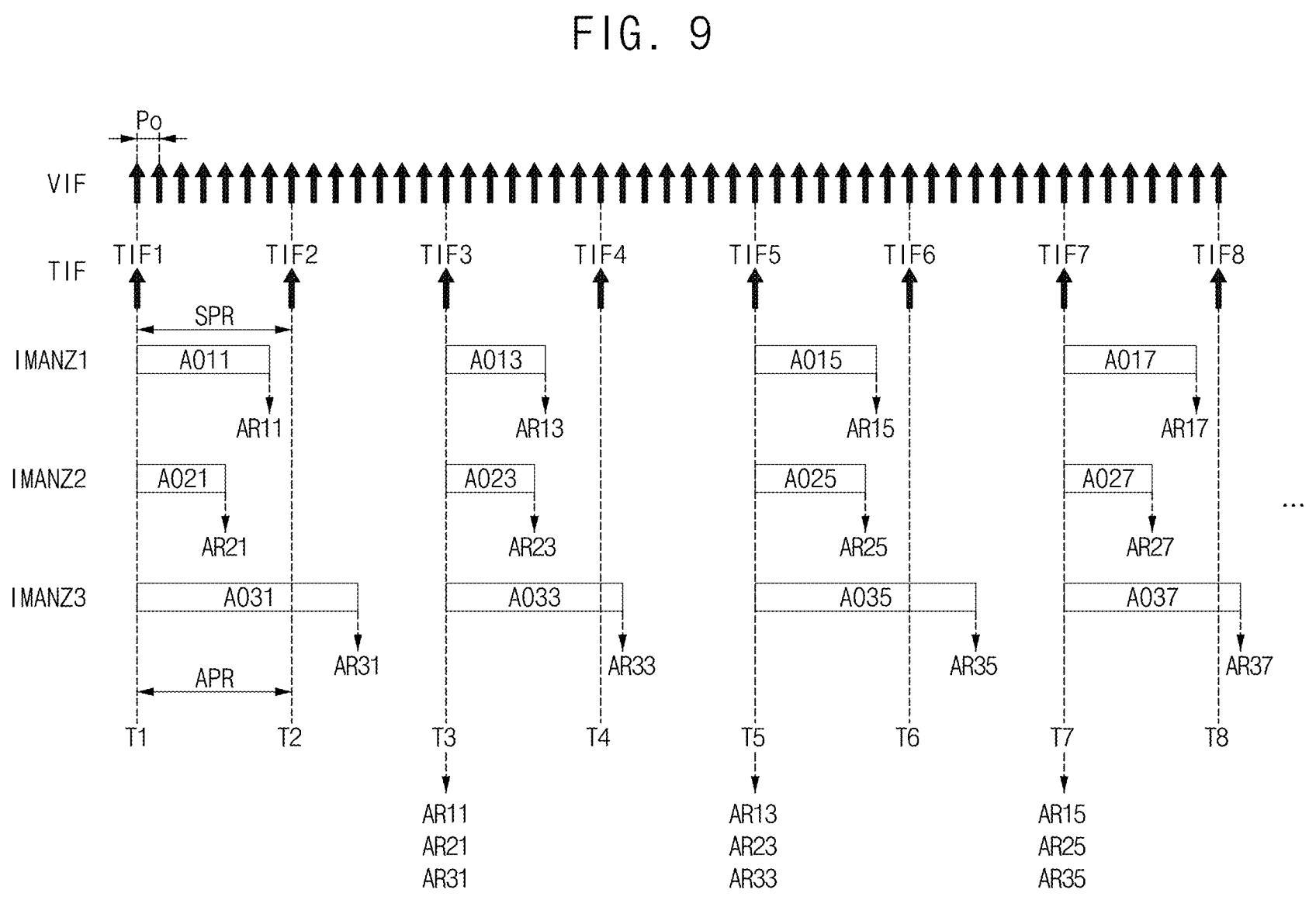

FIG. 9 is a timing diagram illustrating a synchronized analysis scheduling of a plurality of image analyzers. Hereinafter, descriptions repeated with FIG. 7 may be omitted.

FIG. 9 shows an example in which a plurality of analyzers IMANZ1, IMANZ2 and IMANZ3 simultaneously initiate analysis operations on another target image frame after all analysis operations on one target image frame are completed.

At the second time point T2, the analysis results at the second time point T2 are not provided to the security state determiner 400 because the analysis operations AO11, AO12 and AO13 on the first target image frame TIF1 are not all completed. The analysis results AR11, AR21 and AR31 corresponding to the analysis operations AO11, AO12 and AO13 completed at the third time point T3 are provided to the security state determiner 400.

According to this synchronized analysis scheduling, the security state determiner 400 may determine the security mode SMD at the third time point T3 and the fifth time point T5. At the second time point T2, the fourth time point T4 and the sixth time point T6, the security mode SMD may not be updated and the previous security board SMD is maintained. As a result, when the synchronized analysis scheduling of FIG. 9 is followed, the analysis period APR required according to the security policy may not be observed, and a security gap may occur.

On the other hand, the image analysis device 100 according to example embodiments may comply with the required analysis cycle APR and minimize security gaps through the independent analysis scheduling described with reference to FIGS. 7 and 8.

Figure 10A:
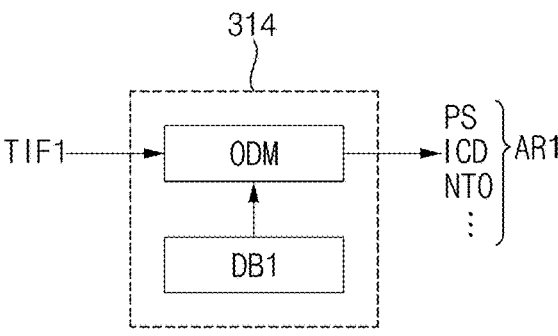
FIGS. 10A, 10B and 10C are diagrams illustrating example embodiments of a plurality of image analyzers included in an image analysis device according to example embodiments.
Figure 10B:
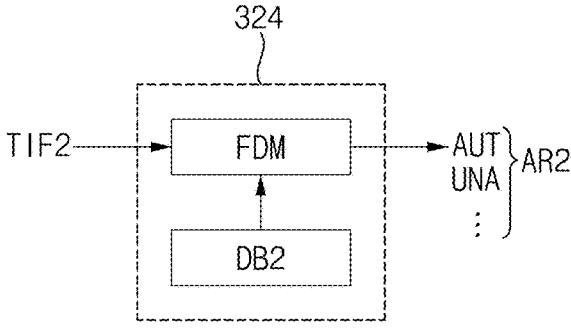
Figure 10C:
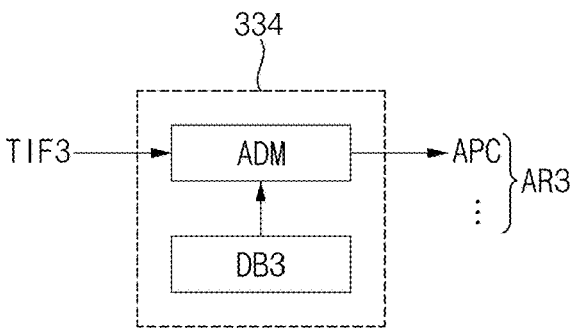

FIGS. 10A, 10B and 10C are diagrams illustrating example embodiments of a plurality of image analyzers included in an image analysis device according to example embodiments. Hereinafter, analysis model operators included in each of three image analyzers using three different image analysis models will be described with reference to FIGS. 10A, 10B, and 10C, but embodiments are not limited thereto. The types of image analysis models and the number of image analyzers of the image analysis device 100 according to example embodiments may be determined in various ways depending on the security policy of the telecommuting work environment.

In FIG. 10A, the first analysis model operator 314 included in the first image analyzer 310 may generate the first analysis result AR1 indicating information on objects included in a target image frame TIF1, using an object detection model ODM. The object detection model ODM may provide information about persons PS, image capturing devices ICD, non-target objects NTO, etc. as the first analysis result AR1 based on information stored in the database DB1.

For example, Convolutional neural network (CNN), You Look Only Once (YOLO) model, Faster R-CNN model, and Detection with Transformer (DETR) may be used as the object detection model ODM. Non-target objects NTO may include cups, tumblers, pencils, notebooks, etc., which are used in daily life.

In FIG. 10B, the second image analyzer 424 included in the second image analyzer 320 may generate the second analysis result AR2 indicating information on whether an authorized user AUT is included in a target image frame TIF2, using a facial detection model FDM. The facial detection (identification) model FDM may provide information on authorized users AUT, unauthorized users UNA, etc. as the second analysis result AR2 based on information stored in the database DB2.

For example, machine learning algorithms such as Support Vector Machine (SVM) that utilize Haar-like feature information and artificial neural network-based algorithms may be used as the facial detection model FDM.

In FIG. 10C, the third analysis model operator 334 included in the third image analyzer 330 may generate the third analysis result AR3 indicating information on whether an action between a person and an object is included in a target image frame TIF3, using an action detection model ADM. The action detection model ADM may provide information about the act of phone call APC, etc. as the third analysis result AR3 based on information stored in the database DB3.

Models that may recognize actions between people and objects, such as Query-based Pairwise HOI Detection (QPIC) model and Instance-Centric Attention Network (iCAN) may be used as the action detection model ADM.

When an image capturing device ICD is detected by the object detection model ODM, the action detection model ADM may differentiate two actions: {person, image capturing device, on call} and {person, image capturing device, not on call}.

In addition to the image analysis models of FIGS. 10A, 10B, and 10C, various artificial intelligence/machine learning-based models may be added and expanded to the image analysis models according to additional needs.

Figure 12:
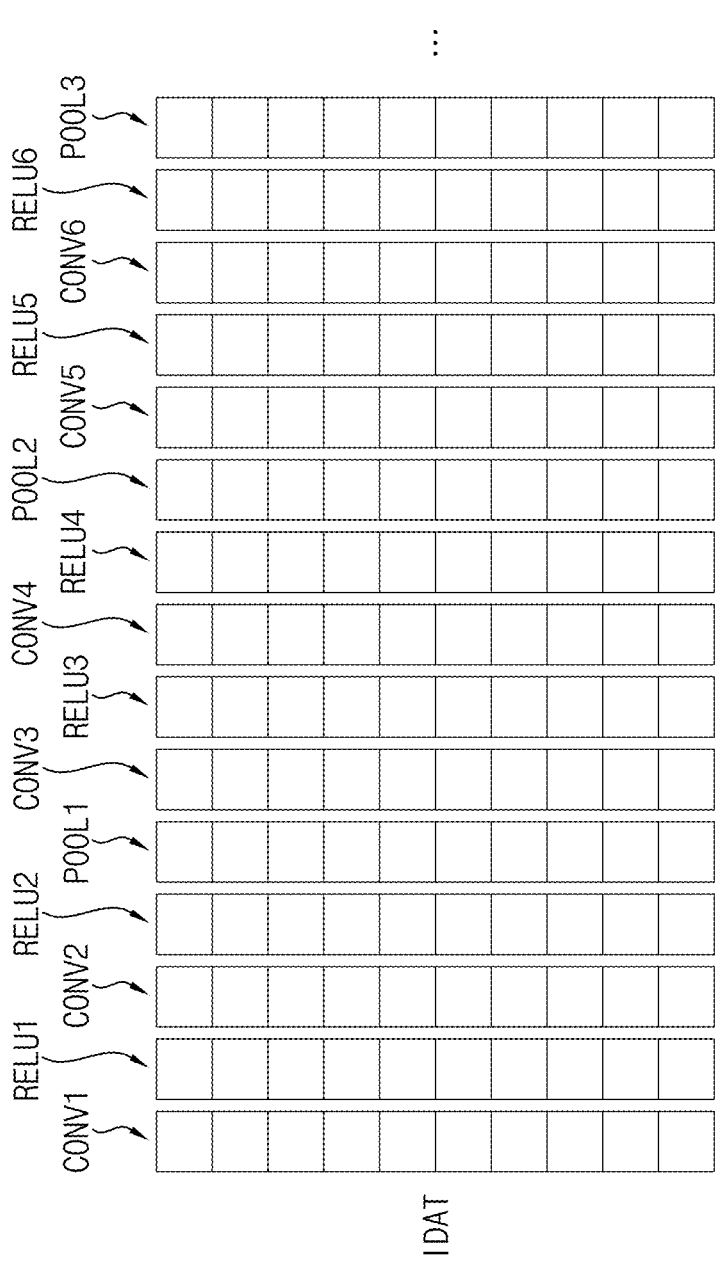

FIGS. 11 and 12 are diagrams for describing examples of a neural network structure that is driven by an image analysis device according to example embodiments. Image analysis models used by the image analyzer according to example embodiments may be implemented with such an artificial neural network structure, but embodiments are not limited thereto.

In FIG. 11, a general neural network may include an input layer IL, a plurality of hidden layers HL1, HL2, . . . , HLn, and an output layer OL.

The input layer IL may include i input nodes x1, x2, . . . , xi, where i is a natural number. Input data (e.g., vector input data) IDAT whose length is i may be input to the input nodes x1, x2, . . . , xi such that each element of the input data IDAT is input to a respective one of the input nodes x1, x2, . . . , xi.

The plurality of hidden layers HL1, HL2, . . . , HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h''_1$, $h''_2$, $h''_3$, . . . , $h''_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h''_1$, $h''_2$, $h''_3$, . . . , $h''_m$, where m is a natural number.

The output layer OL may include j output nodes $y_1$, $y_2$, . . . , $y_j$, where j is a natural number. The output layer OL may output the output data ODAT associated with the input data IDAT.

A structure of the neural network illustrated in FIG. 11 may be represented by information on branches (or connections) between nodes illustrated as lines, and a weighted value assigned to each branch. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation, or calculation on the received output, and may output a result of the computing operation, computation, or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 11 may not be suitable for handling input image data when each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the convolutional neural network.

In FIG. 12, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3, and FC.

Unlike the general neural network, each layer of the convolutional neural network may have three dimensions of width, height, and depth. Thus, data that is input to each layer may be volume data having three dimensions of width, height, and depth. For example, if an input image in FIG. 12 has a size of 32 width units (e.g., 32 pixels) and 32 height units (e.g., 32 pixels) and three color channels R, G, and B, then input data IDAT corresponding to the input image may have a size of 32×32×3. The input data IDAT may be referred to as input volume data or input activation volume.

Each of convolutional layers CONV1, CONV2, CONV3, CONV4, CONV5, and CONV6 may perform a convolutional operation on input volume data. In an image processing, the convolutional operation represents an operation in which image data is processed based on a mask with weighted values, and an output value is obtained by multiplying input values by the weighted values and adding up the total multiplied values. The mask may be referred to as a filter, window, or kernel.

In further detail, parameters of each convolutional layer may consist of or include a set of learnable filters. Every filter may be spatially small (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, then output volume data of the convolutional layer CONV1 may have a size of 32×32×12 (e.g., a depth of volume data increases).

Each of RELU layers RELU1, RELU2, RELU3, RELU4, RELU5, and RELU6 may perform a rectified linear unit operation that corresponds to an activation function defined by, e.g., a function $f(x)=\max(0, x)$ (e.g., an output is zero for all negative input x). For example, if input volume data having a size of 32×32×12 passes through the RELU layer RELU1 to perform the rectified linear unit operation, then output volume data of the RELU layer RELU1 may have a size of 32×32×12 (e.g., a size of volume data is maintained).

Each of pooling layers POOL1, POOL2, and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, then output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing an image spatial size and extracting an image characteristic.

It is understood that the types and number of layers included in the convolutional neural network may not be limited to the example described above with reference to FIG. 12 and may be changed or vary according to one or more other example embodiments. In addition, it is understood that the convolutional neural network may further include other layers such as a softmax layer for converting score values corresponding to predicted results into probability values, a bias adding layer for adding at least one bias, or the like.

Figure 13:
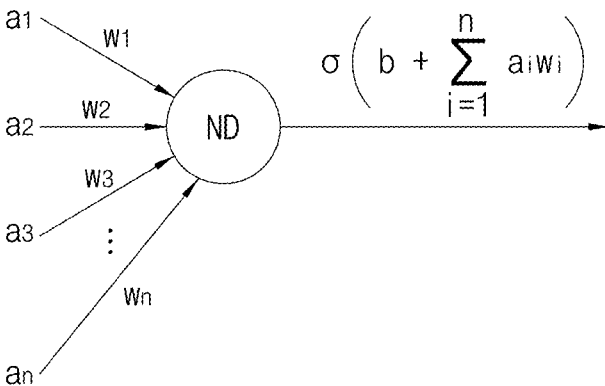
FIG. 13 is a diagram illustrating an example of a node included in a neural network.

FIG. 13 is a diagram illustrating an example of a node included in a neural network.

FIG. 13 illustrates an example node operation performed by a node ND in a neural network. When N inputs $a_1 \sim a_n$ are provided to the node ND, the node ND may multiply the n inputs $a_1 \sim a_n$ and corresponding n weights $w_1 \sim w_n$, respectively, may sum n values obtained by the multiplication, may add an offset "b" to a summed value, and may generate one output value by applying a value to which the offset "b" is added to a specific function "σ". The learning operation may be performed based on the training data to update all nodes in the neural network.

In the case of deep learning-based image processing, a sufficient amount of training data or training data is required for learning. In the case of training data for use in deep learning-based algorithms, various types of data may be used to prevent over-fitting and improve performance during learning.

Figure 14:
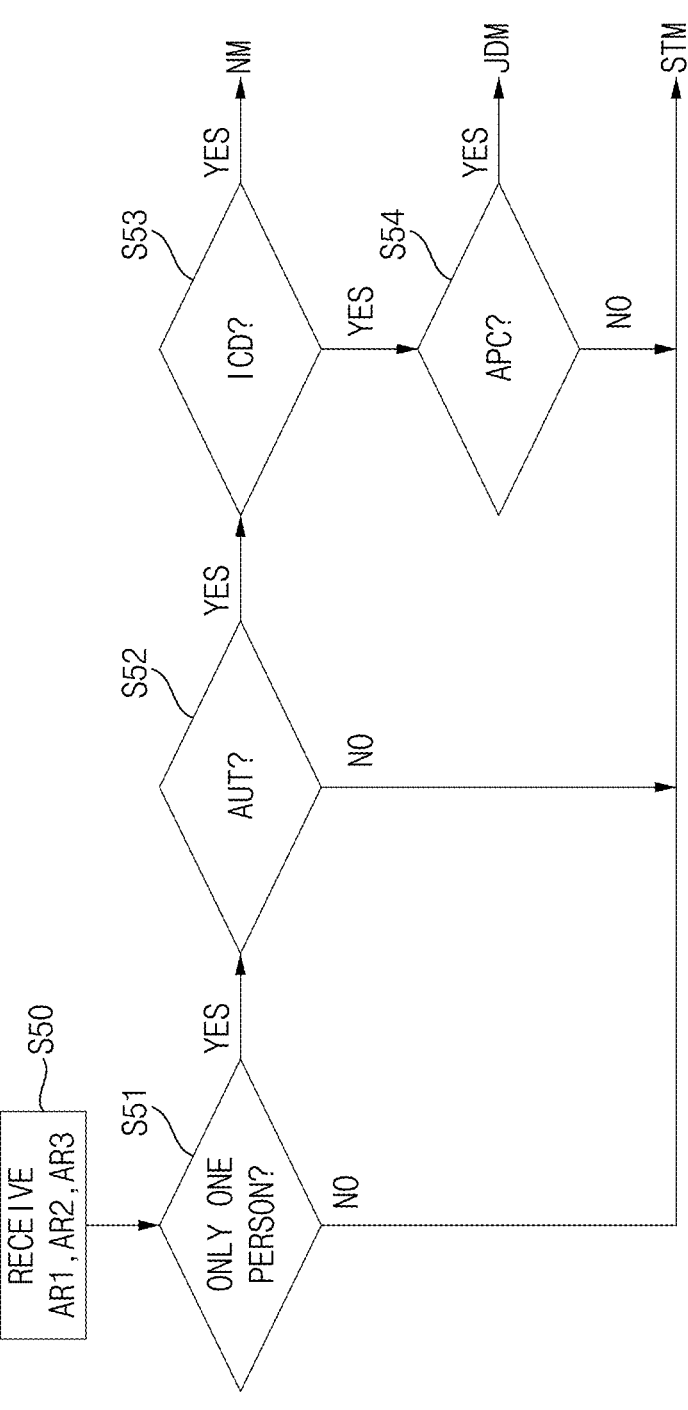
FIG. 14 is a flowchart illustrating an example embodiment of determining a security mode in an image analysis method according to example embodiments.

FIG. 14 is a flowchart illustrating an example embodiment of determining a security mode in an image analysis method according to example embodiments, and FIGS. 15A through 15D are examples of a target image frame to be analyzed.

Referring to FIGS. 1 and 14, the security state determiner 400 may receive the most recently generated analysis results from the plurality of image analyzers 300 periodically by a constant analysis period APR (S50), as described with reference to FIG. 7. For example, the security state determiner 400 may receive the first analysis result AR1 from the first image analyzer 310 including the object detection model ODM of FIG. 10A, the second analysis result AR2 from the second image analyzer 320 including the facial detection model FDM of FIG. 10B, and the third analysis result AR3 from the third image analyzer 330 including the action detection model ADM of FIG. 10C.

The security state determiner 400 may determine the security mode SMD as one of the normal mode NM, the security threat mode STM and the judgment-deferred mode JDM periodically by the constant analysis period APR, regardless of the analysis times of the image analyzers 310, 320 and 330.

The security state determiner 400 may determine the security mode SMD as the normal mode NM when only one person is detected by the first analysis result AR1 (S51: YES), an authorized user AUT is detected by the second analysis result AR2 (S52: YES), and the image capturing device ICD is not detected by the first analysis result AR1 (S53: NO).

The security state determiner 400 may determine the security mode SMD as the security threat mode STM when no person is detected or two or more persons are detected by the first analysis result AR1 (S51: NO), or when an unauthorized user is detected by the second analysis result AR2 (S52: NO). In addition, the security state determiner 400 may determine the security mode SMD as the security threat mode STM when only one person is detected by the first analysis result AR1 (S51: YES), an authorized user AUT is detected by the second analysis result AR2 (S52: YES), the image capturing device ICD is detected by the first analysis result AR1 (S53: YES), and the phone calling action APC is not detected by the third analysis result AR3 (S54: NO).

The security state determiner 400 may determine the security mode SMD as the judgment-deferred mode JDM when only one person is detected by the first analysis result AR1 (S51: YES), an authorized user AUT is detected by the second analysis result AR2 (S52: YES), the image capturing device ICD is detected by the first analysis result AR1 (S53: YES), and the phone calling action APC is detected by the third analysis result AR3 (S54: YES).

As described above, the security state determiner 400 may receive the blurriness value BLR indicating the blurriness of the target image frame TIF from the image converter 200 as described with reference to FIG. 5. The security state determiner 400 may determine the security mode SMD as the judgment-deferred mode JDM when the blurriness of the target image frame TIF provided from the image converter is higher than a reference level, regardless of the analysis results AR1, AR2 and AR3.

In the case of the target image frame TIFa of FIG. 15A, one person is detected and no image capturing device is detected. In this case, the security mode SMD may be determined as the normal mode NM or the security threat mode STM depending on whether the detected person is an authorized user.

In the case of the target image frame TIFb of FIG. 15B, two persons are detected. In this case, the security mode SMD may be determined as the security threat mode STM.

Figure 15C:
Figure 15D:
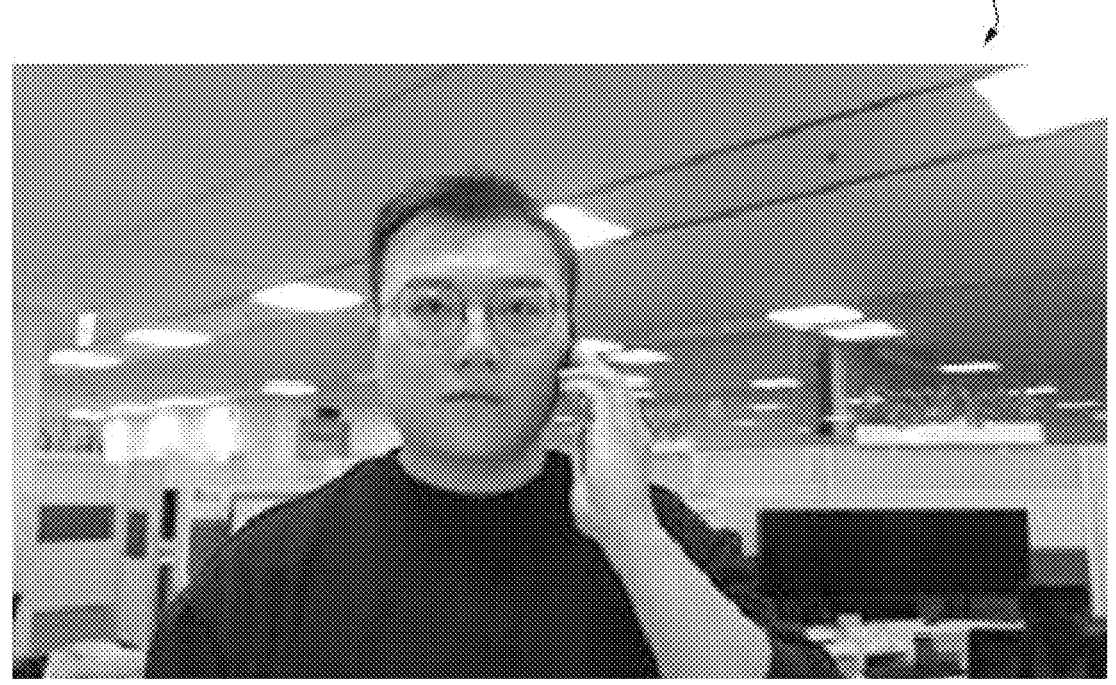

In the cases of the target image frames TIFc and TIFd of FIGS. 15C and 15D, one authorized user and an image capturing device are detected. The security mode SMD may be determined as the security threat mode STM when no phone calling action is detected as shown in the target image frame TIFc of FIG. 15C. On the other hand, the security mode SMD may be determined as the judgment-deferred mode JDM when the phone calling action is detected as shown in the target image frame TIFd of FIG. 15D.

The terminal device may apply various security policies based on the security mode SMD determined in this way. In an example embodiment, as will be described below with reference to FIG. 20, the terminal device may allow security data to be displayed through the display device of the terminal device in the normal mode NM, and block the security data to be displayed through the display device in security threat mode STM.

The security policy in the judgment-deferred mode JDM may be determined in various ways. For example, depending on the security policy, the display of the security data through the display device in the judgment-deferred mode JDM may be permitted or blocked. By appropriately operating the security policy in the judgment-deferred mode JDM, the efficiency of the telecommuting work may be promoted while simultaneously maintaining the security of the telecommuting work environment. In an example embodiment, the security state determiner 400 may switch the security mode SMD from the judgment-deferred mode JDM to the security threat mode STM when the judgment-deferred mode JDM continues for a predetermined reference time.

Figure 16A:
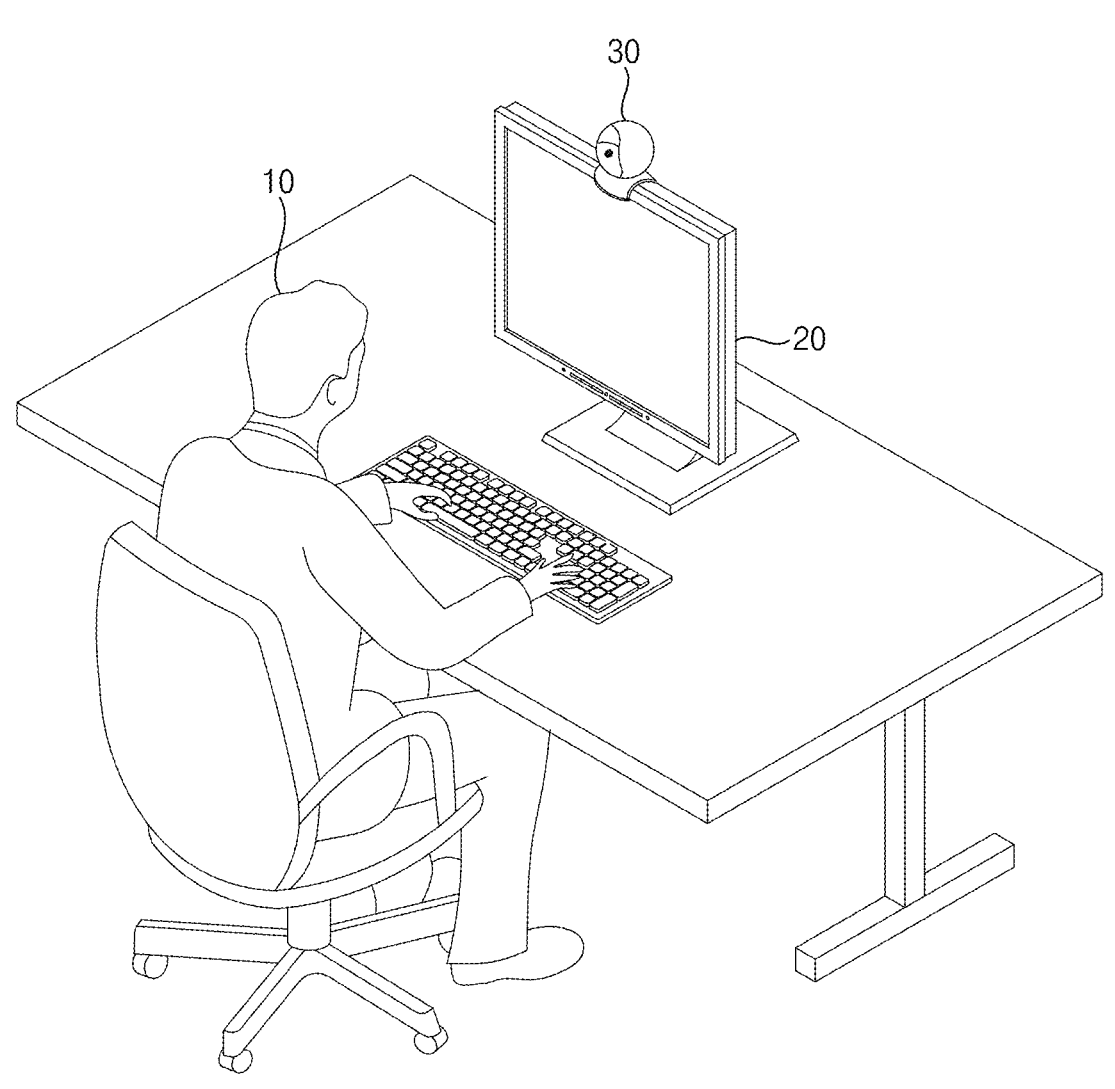
FIGS. 16A and 16B are diagrams illustrating examples of telecommuting work environments in which an image analysis method according to example embodiments is applicable.
Figure 16B:
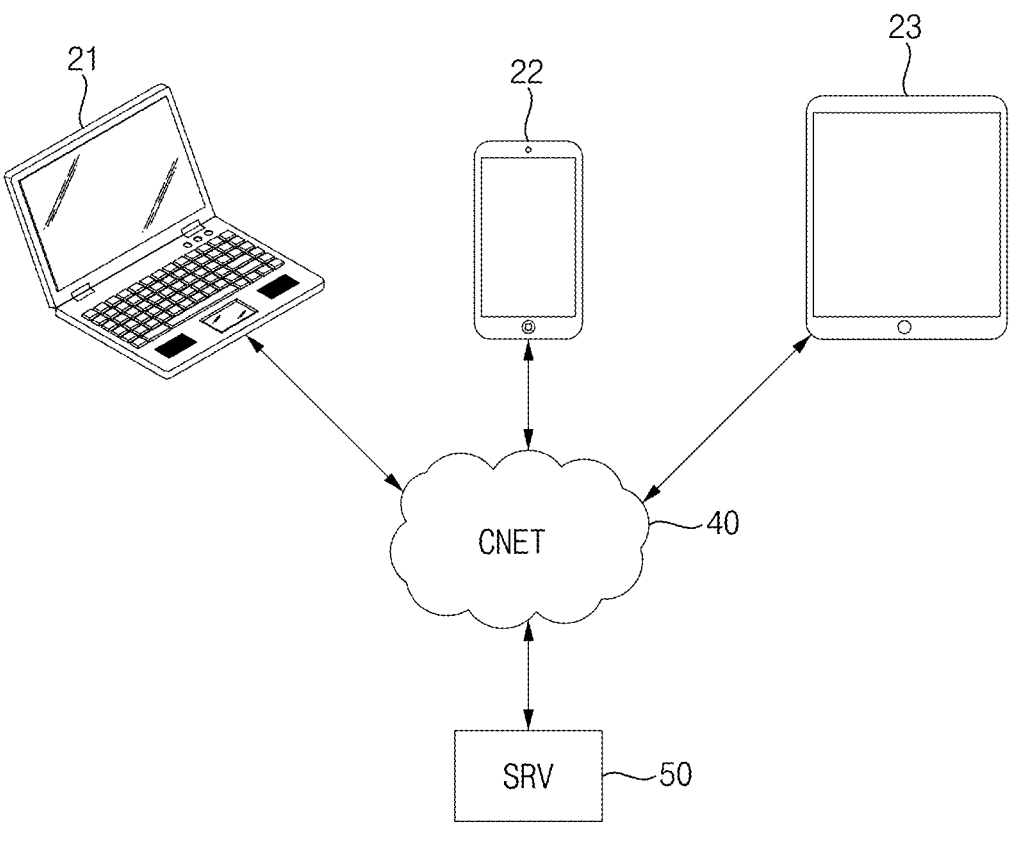

FIGS. 16A and 16B are diagrams illustrating examples of telecommuting work environments in which an image analysis method according to example embodiments is applicable.

As shown in FIG. 16A, a user 10 may be working remotely or working from home using a terminal device 20, and may be working remotely or working from home, and may process security data including trade secrets or personal information of his or her company or organization through the terminal device 20. The security data output through the display device of the terminal device 20 may be exposed intentionally or unintentionally to other people (for example, unauthorized users) present in the workspace of the user 10. To prevent security incidents exposed to unauthorized users, a camera 30 connected to the terminal device 20 may be used. Here, the camera 30 may be included in the terminal device 20 or provided in a detachable manner.

FIG. 16B shows a telecommuting work environment in which an information processing system or server system SRV 50 is connected to a plurality of terminal devices 21, 22 and 23 through a communication network CNET 40. The server system 50 may include a system capable of providing data security services to the plurality of terminal devices 21, 22 and 23 through the communication network 40. According to an example embodiment, the server system 50 may include one or more server devices and/or databases capable of storing, serving, and executing computer-executable programs (e.g., downloadable applications) and data related to the data security services, or one or more distributed computing devices and/or distributed databases based on cloud computing services. The data security services may be provided to users through a security data operation application or security module installed in each of the plurality of terminal devices 21, 22 and 23. The image analysis device according to example embodiments as described above may be included in each of the terminal devices 21, 22 and 23 or the server system 50. The server system 50 may learn and update the above-described image analysis models based on learning data (e.g., images) collected from the camera. Additionally, the image analysis device may effectively detect security threats by executing an AI image analysis model on images captured by the camera using the image analysis models learned or trained by the server system 50.

The communication network 40 may be configured to enable communication between the plurality of terminal devices 21, 22 and 23 and the server system 50. Depending on the installation environment, the communication network 40 may include, for example, wired networks such as Ethernet, a wired home network, a telephone line communication device, and RS-serial communication, a mobile communication network, or a wireless LAN (WLAN), and/or wireless networks such as Wi-Fi, Bluetooth, and ZigBee, or a combination thereof. The communication method is not limited, and may include not only a communication method utilizing communication networks that the communication network 40 may include (e.g., mobile communication network, wired Internet, wireless Internet, broadcasting network, satellite network, etc.), but also short-range wireless communication.

The terminal device may be any computing device capable of wired and/or wireless communication and capable of installing and executing a security data operation application. For example, the terminal devices may include smartphones, mobile phones, navigation devices, computers, laptops, digital broadcasting terminals, PDAs (Personal Digital Assistants), PMPs (Portable Multimedia Players), tablet PCs, game consoles, and wearable devices, IoT (internet of things) devices, VR (virtual reality) devices, AR (augmented reality) devices, etc. In addition, in FIG. 16B, three terminal devices 21, 22, and 23 are shown communicating with the server system 50 through the communication network 40, but the various number of terminal devices may communicate with the server system 50 via the communication network 40.

Figure 17:
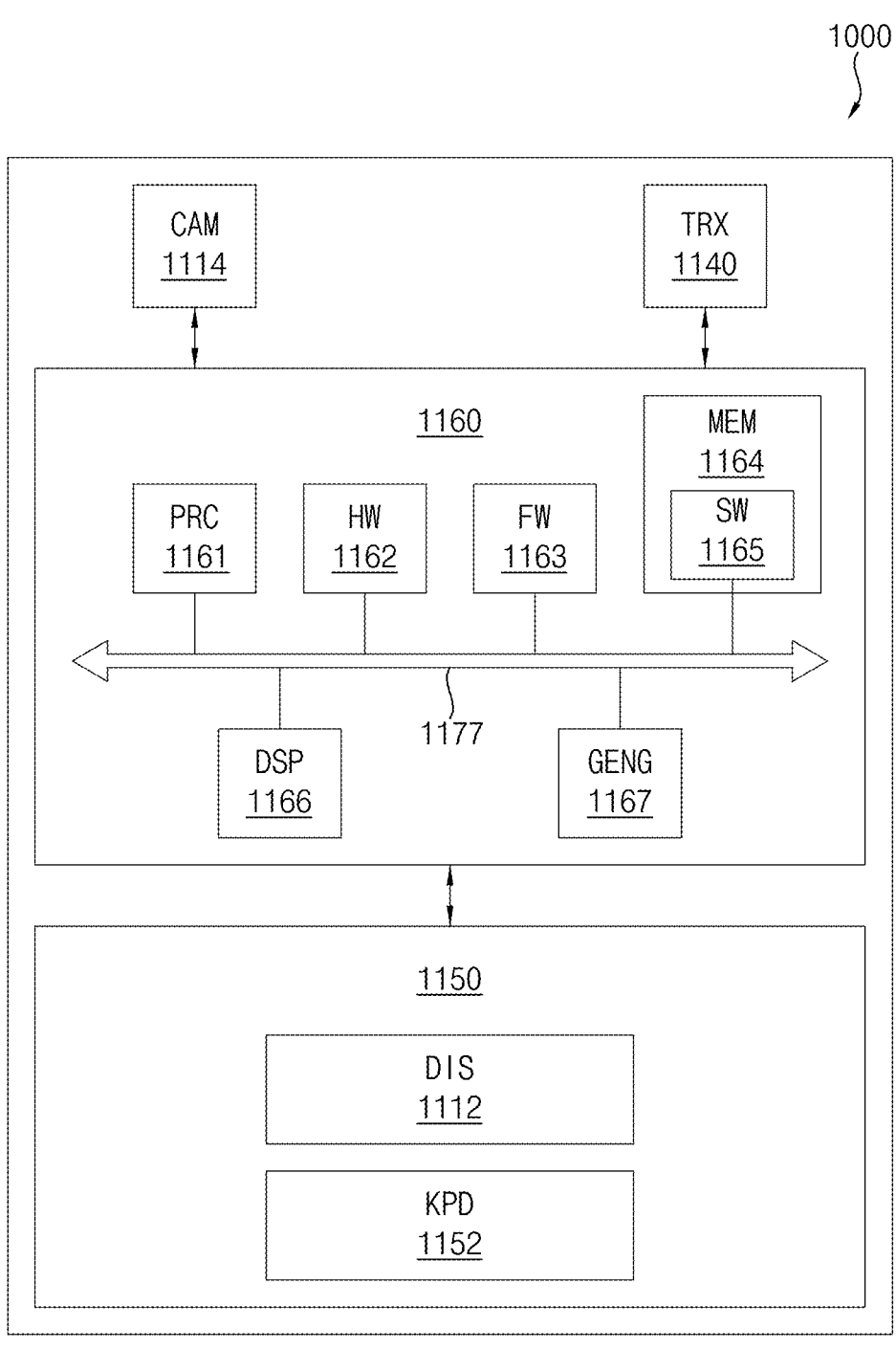
FIG. 17 is a block diagram illustrating a terminal device according to example embodiments.

FIG. 17 is a block diagram illustrating a terminal device according to example embodiments.

In FIG. 17, a system 1000 may include camera module CAM 1114, a transceiver TRX 1140, a controller 1160, and a user interface 1150.

The camera module 1114 may include a camera and/or an image sensor to capture and provide images. In some example embodiments, the camera module 1114 may include a plurality of cameras to capture a plurality of input images to be merged. In some example embodiments, the camera module 1114 may provide a plurality of input images to be merged where the plurality of input images are captured by a single camera.

The transceiver 1140 may provide connectivity through wired or wireless links to other networks such as an internet, a cellular network, etc.

The user interface 1150 may include input devices KPD 1152, such as a keyboard, a keypad, etc., and a display device DIS 1112 to display images. In some example embodiments, a virtual keypad or keyboard may be integrated into the display device 1112 with a touch screen/ sensor or the like.

The controller 1160 may include a general purpose processor PRC 1161, a hardware device HW 1162, a firmware device FW 1163, a memory MEM 1164, a digital signal processor DSP 1166, a graphics engine GENG 1167, and a bus 1177. The controller 1160 may perform the image analysis method according to example embodiments. Thus, the controller 1160 may be configured to perform functions of the image analysis device and the artificial neural network corresponding to the image analysis models as described above.

Example embodiments may be implemented as hardware, software, firmware, or a combination thereof.

In some example embodiments, the image analysis method according to example embodiments may be performed by the digital signal processor 1166. For example, the image analysis device and the artificial neural network as described above may be included in the digital signal processor 1166.

In some example embodiments, at least a portion of the methods according to example embodiments may be performed by program instructions that are executed by a processing device. The program instructions may be stored in the memory 1164 as software SW 1165, and the program instructions may be performed by the general purpose processor 1161 and/or the digital signal processor 1166.

In some example embodiments, to execute the program instructions, the general purpose processor 1161 may retrieve or fetch the program instructions from an internal register, an internal cache or the memory 1164 and decode and execute the instructions. During or after execution of the program instructions, the general purpose processor 1161 may write one or more results (which may be intermediate or final results) of the program instructions to the internal register, internal cache, or the memory 1164.

The system 1000 may be a computer system taking any suitable physical form. For example, the system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing methods according to example embodiments may be stored in a computer-readable non-transitory storage medium or media. The computer-readable non-transitory storage medium may include one or more semiconductor-based or other integrated circuits (ICs) (for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, Secure Digital (SD) cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 18:
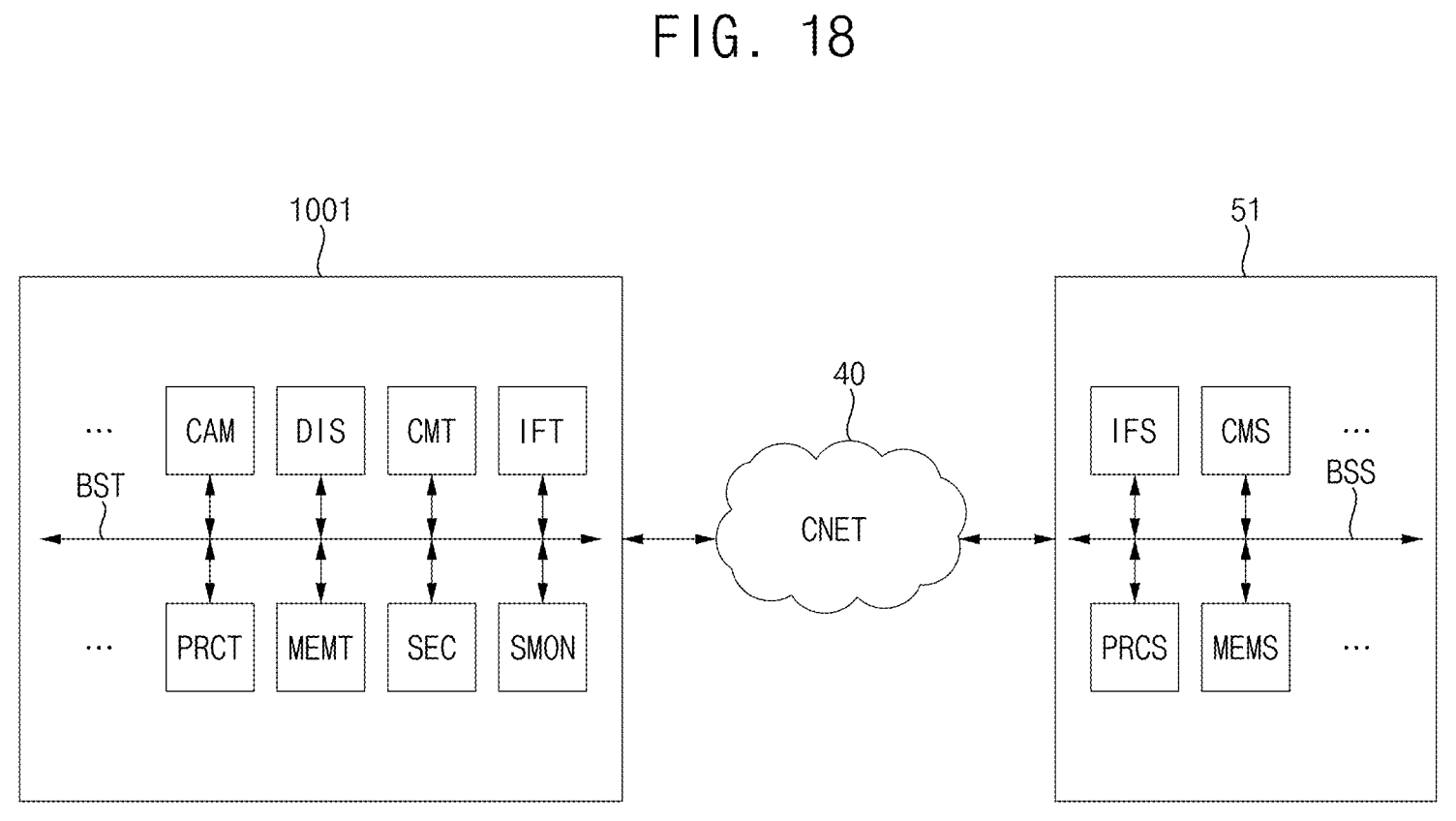
Figure 19:
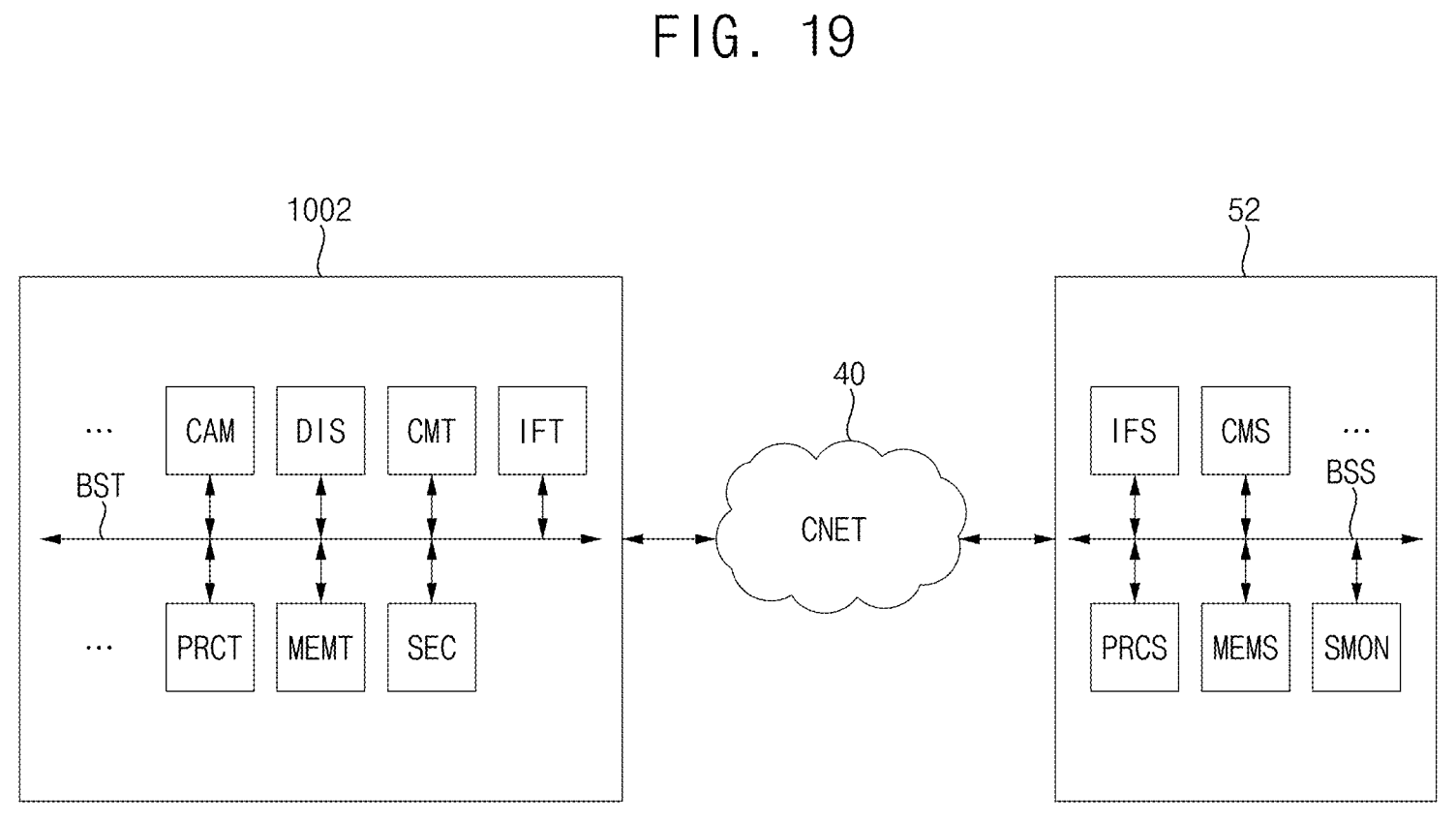

FIGS. 18 and 19 are diagrams illustrating telecommuting work environments including an image analysis device according to example embodiments.

In FIG. 18, a telecommuting work environment may include at least one terminal device 1001, a communication network CNET 40 and a server system 51. The terminal device 1001 includes a camera CAM, a display device DIS, a communication module CMT, an input-output interface IFT, a processor PRCT, a memory MEMT, and a security module SEC, an image analysis device SMON, etc., which are connected through an internal bus BST. The server system 51 may include an input-output interface IFS, a communication module CMS, a processor PRCS, a memory MEMS, etc., which are connected through an internal bus BSS.

The terminal device 1001 may refer to any computing device capable of executing a security data operation application and capable of wired or wireless communication. As shown in FIG. 18, the terminal device 1001 and the server system 51 are configured to communicate information and/ or data through the communication network 40 using respective communication modules CMT and CMS. Additionally, the terminal device 1001 and the server system 51 may be configured to input information and/or data or output generated information and/or data through respective the input-output interfaces IFT and IFS. In FIG. 18, the camera CAM is shown as being included in the terminal device 1001, but example embodiments are not limited thereto, and the camera CAM may be coupled to the terminal device 1001 in a detachable manner.

The memories MEMT and MEMS may include any non-transitory computer-readable recording medium. According to example embodiments, the memories MEMT and MEMS may be a non-transitory mass storage device such as random access memory (RAM), read only memory (ROM), disk drive, solid state drive (SSD), flash memory, etc. As another example, non-transitory mass storage devices such as ROM, SSD, flash memory, disk drive, etc. may be included in the terminal device 1001 or the server system 51 as a separate persistent storage device that is distinct from the memories MEMT and MEMS. Additionally, an operating system and at least one security-related program code may be stored in the memories MEMT and MEMS. These software components may be loaded from a computer-readable recording medium separate from the memories MEMT and MEMS.

The processors PRCT and PRCS may be configured to process instructions of a computer program by performing basic arithmetic, logic, and input-output operations. Commands may be provided to the processors PRCT and PRCS by the memories MEMT and MEMS or the communication modules CMT and CMS. For example, the processors PRCT and PRCS may be configured to execute received instructions according to program code stored in a recording device such as the memories MEMT and MEMS.

The camera CAM may capture the front of the display device DIS and generate video image frames. The image analysis device SMON may determine a security mode based on the video image frames. The security module SEC may control the display of the security data through the display device DIS based on the security mode. Display control of the security data will be described below with reference to FIG. 20.

As described above, the image analysis device SMON may generate the target image frames to be analyzed based on the video image frames, and analyze the target image frames using different video analysis models. A plurality of analysis results may be generated, the independent analysis scheduling may be performed regardless of the analysis execution states of other image analyzers, and the security mode of the terminal device may be determined based on the plurality of analysis results.

As described above, the image analysis models may be implemented in an artificial neural network structure, the image analysis models may be trained by the server system 51, and the trained image analysis models may be provided to the terminal device 1001. The terminal device 1001 may determine the security mode by analyzing the target image frames provided in real time from a camera CAM using the trained image analysis models. The security module SEC may execute security policies, such as controlling the display of the security data, based on the security mode.

In FIG. 19, a telecommuting work environment may include at least one terminal device 1002, a communication network CNET 40, and a server system 52. The telecommuting work environment of FIG. 19 is substantially the same as the telecommuting work environment of FIG. 18 except that the image analysis device SMON is included in the server system 52, and thus repeated descriptions are omitted.

In the case of the telecommuting work environment of FIG. 19, the video image frames obtained from the camera CAM of the terminal device 1002 may be provided to the server system 52 through the communication network 40. At this time, the video image frames may be provided to the server system 52 in an encrypted state by the terminal device 1002. Information about the security mode determined by the image analysis device SMON of the server system 52 may be provided to the security module SEC of the terminal device 1002 through the communication network 40. At this time, information about the security mode may be provided to the terminal device 1002 in an encrypted state by the server system 52.

Figure 20:
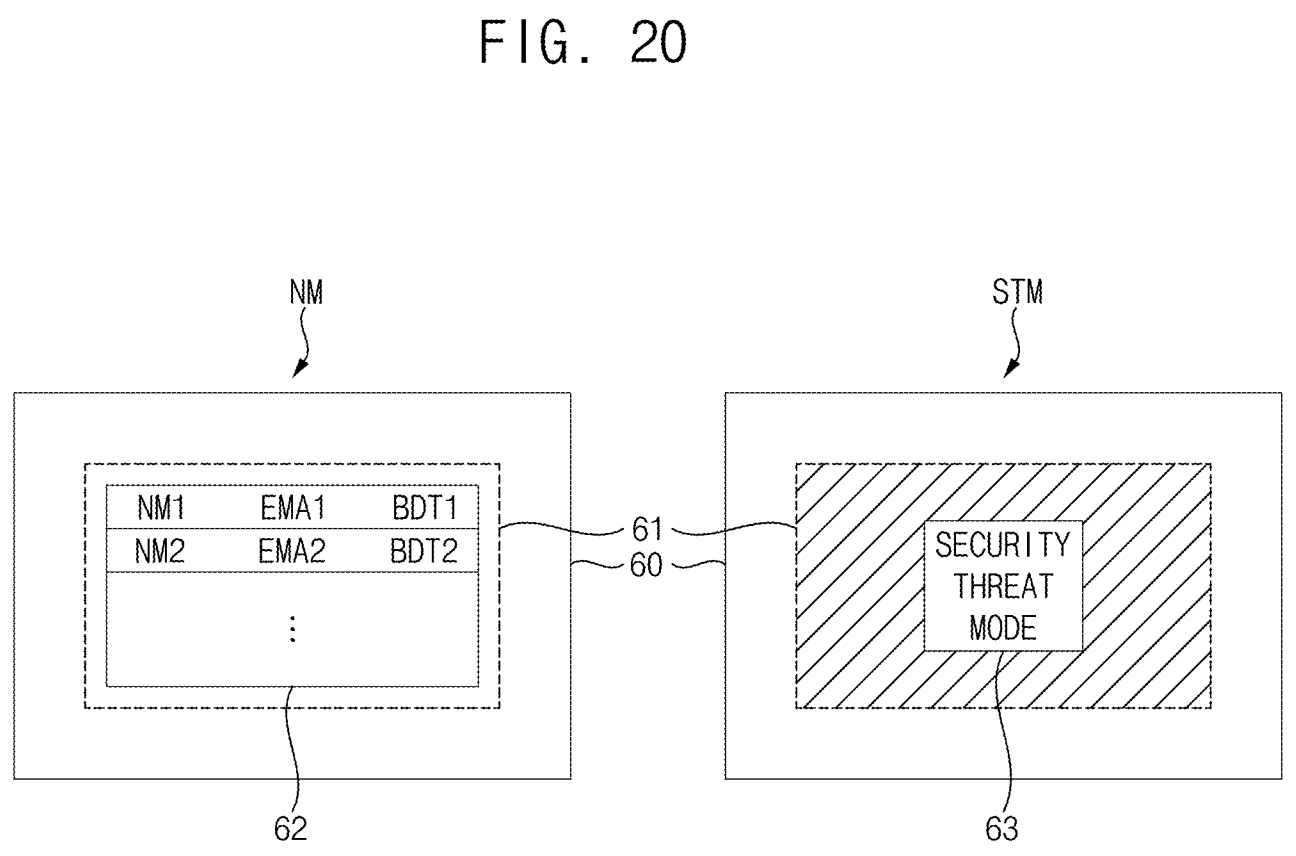

FIG. 20 is a diagram illustrating display of security data depending on operation modes in an image analysis method according to example embodiments.

In FIG. 20, when the security mode is the normal mode NM, security data 62 may be allowed to be displayed in a security area 61 corresponding to at least a portion of the display screen 60. On the other hand, when the security mode is the security threat mode STM, the security data 62 may be blocked from being displayed in the security area 61 of the display screen 60. In an example embodiment, a warning text 63 may be displayed in the security area 61 in the security threat mode STM.

In some example embodiments, when it is determined that the operation of the security data is not possible, the security area 61 may be set on the display screen 60 such that unauthorized users cannot see the security data 62, for example, personal information such as names NM1 and NM2, email addresses EMA1 and EMA2, dates of birth BDT1 and BDT2 displayed on display screen 60. For example, the security area 61 may include an opaque layer or a partially transparent layer on the display 60 such that the security data 62 cannot be read by the naked eye. For example, in security threat mode STM, the security area 61 may be subjected to any visual or graphic processing such as mosaic or blur processing that prevents the security data 62 from being visible to the naked eye. Additionally or alternatively, the terminal device may display the warning text 63 in the security area 61 in the security threat mode STM.

In some example embodiments, a service stream containing security data provided from a server system to a terminal device may be interrupted in the security threat mode STM.

Specifically, in this case, a new access token may not be provided until the access token provided from the server system to the terminal device is invalidated or its validity period expires. In some example embodiments, in the security threat mode STM, the operation of another output device connected to the user terminal device may be stopped. For example, the output of a speaker that outputs voice related to the security data or a printer that outputs data related to the security data may be interrupted.

In this way, when the security mode is determined to be security threat mode STM by the image analysis device according to example embodiments, the security of the telecommuting work environment may be maintained by blocking exposure of the security data.

As described above, the image analysis device and the image analysis method according to example embodiments may improve analysis speed through parallel analysis using the plurality of image analyzers and efficiently provide telecommuting work environments of seamless security through independent analysis scheduling of the plurality of image analyzers.

Those skilled in the art will understand that embodiments of this disclosure may be implemented in the form of a system, method, product including computer-readable program code stored in a computer-readable medium, etc. The computer-readable program code may be provided to a processor of various computers or other data processing devices. The computer-readable medium may be a computer-readable signal medium or a computer-readable recording medium. The computer-readable recording medium may be any tangible medium capable of storing or containing a program in or connected to an instruction execution system, equipment, or device.

Embodiments of this disclosure may be applied to any electronic devices and systems used in telecommuting work environments. For example, the disclosure may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the disclosure.

What is claimed is:

1. An image analysis device comprising:
   an image converter configured to generate target image frames based on video image frames captured by a terminal device;
   a plurality of image analyzers respectively comprising a plurality of image analysis models, the plurality of image analyzers being configured to:
   generate a plurality of analysis results by analyzing the target image frames respectively using the plurality of image analysis models different from each other, and
   perform a respective analysis scheduling independently regardless of analysis execution states of other image analyzers; and a security state determiner configured to determine a security mode of the terminal device based on the plurality of analysis results, wherein at least one image analyzer of the plurality of image analyzers is further configured to omit an analysis of a target image frame that is received from the image converter before the at least one image analyzer completes an analysis of a previous target image frame of the target image frames.

2. The image analysis device of claim 1, wherein the security state determiner is configured to determine the security mode periodically by an analysis period regardless of analysis times of the plurality of image analyzers.

3. The image analysis device of claim 1, wherein the at least one image analyzer of the plurality of image analyzers is further configured to provide to the security state determiner, periodically by an analysis period, an analysis result that is generated most recently by the at least one image analyzer.

4. The image analysis device of claim 1, wherein the at least one image analyzer of the plurality of image analyzers comprises:

an analysis model operator configured to generate an analysis result by analyzing a target image frame using an image analysis model of the at least one image analyzer; and an analysis operation controller configured to control an analysis scheduling of the analysis model operator based on an analysis execution state of the analysis model operator.

5. The image analysis device of claim 4, wherein the analysis operation controller is configured to control the analysis scheduling of the analysis model operator, and wherein the analysis model operator is configured to omit an analysis of one target image frame of the target image frames before the at least one image analyzer completes an analysis of the previous target image frame of the target image frames.

6. The image analysis device of claim 4, wherein the analysis operation controller is configured to transfer the target image frame received from the image converter to the analysis model operator in a ready state in which the analysis model operator completes an analysis of a previous target image frame, and wherein the analysis operation controller is configured not to transfer the target image frame received from the image converter to the analysis model operator in a busy state in which the analysis model operator does not complete the analysis of the previous target image frame.

7. The image analysis device of claim 4, wherein the analysis operation controller comprises:

an analysis model executor configured to generate the analysis result by executing the image analysis model of the at least one image analyzer; and a result storage configured to store the analysis result.

8. The image analysis device of claim 7, wherein the result storage comprises:

a first storage configured to store a most recent analysis result with respect to the target image frame that is received previously by the analysis model operator; and a second storage configured to store the analysis result with respect to the target image frame that is analyzed presently by the analysis model operator.

9. The image analysis device of claim 1, wherein the plurality of image analyzers comprise:

a first image analyzer configured to generate, using an object detection model, a first analysis result indicating information on objects in a target image frame;

a second image analyzer configured to generate, using a facial detection model, a second analysis result indicating information on whether the target image frame comprises an authorized user; and a third image analyzer configured to generate, using an action detection model, a third analysis result indicating information on whether the target image frame comprises an action between a person and an object.

10. The image analysis device of claim 9, wherein the security state determiner is configured to determine the security mode as one of a normal mode, a security threat mode and a judgment-deferred mode periodically by an analysis period, based on the first analysis result, the second analysis result and the third analysis result.

11. The image analysis device of claim 10, wherein the security state determiner is configured to determine the security mode as the normal mode based on a determination that one person is detected by the first analysis result, the authorized user is detected by the second analysis result and an image capturing device is not detected by the first analysis result.

12. The image analysis device of claim 10, wherein the security state determiner is configured to determine the security mode as the security threat mode based on a determination that no person is detected or two or more persons are detected by the first analysis result, or based on a determination that an unauthorized user is detected by the second analysis result, and wherein the security state determiner is configured to determine the security mode as the security threat mode based on a determination that one person is detected by the first analysis result, the authorized user is detected by the second analysis result, an image capturing device is detected by the first analysis result, and a phone calling action is not detected by the third analysis result.

13. The image analysis device of claim 10, wherein the security state determiner is configured to determine the security mode as the judgment-deferred mode based on a determination that one person is detected by the first analysis result, the authorized user is detected by the second analysis result, an image capturing device is detected by the first analysis result, and a phone calling action is detected by the third analysis result.

14. The image analysis device of claim 10, wherein the security state determiner is configured to determine the security mode as the judgment-deferred mode based on a determination that a blurriness of the target image frame provided from the image converter is higher than a reference level.

15. The image analysis device of claim 10, wherein display of security data through a display device of the terminal device is permitted in the normal mode, and the display of the security data is blocked in the security threat mode.

16. The image analysis device of claim 1, wherein the image converter comprises:

a receiver configured to receive a video stream and obtain the video image frames in the video stream;

a sampler configured to sample the video image frames and output sampled image frames periodically by a sampling period;

a scaler configured to generate scaled image frames by adjusting a size of the sampled image frames; and a format converter configured to generate the target image frames by converting a format of the scaled image frames.

17. An image analysis method comprising:

generating, by an image converter, target image frames based on video image frames captured by a terminal device;

generating a plurality of analysis results by a plurality of image analyzers respectively comprising a plurality of image analysis models, the plurality of image analyzers analyzing the target image frames respectively using the plurality of image analysis models different from each other;

performing a respective analysis scheduling independently regardless of analysis execution states of other image analyzers; and determining a security mode of the terminal device based on the plurality of analysis results, wherein at least one image analyzer of the plurality of image analyzers is configured to omit an analysis of a target image frame that is received from the image converter before the at least one image analyzer completes an analysis of a previous target image frame of the target image frames.

18. The image analysis method of claim 17, wherein the security mode is determined periodically by an analysis period regardless of analysis times of the plurality of image analyzers.

19. A terminal device comprising:

a display device;

a camera configured to generate video image frames captured by the display device;

an image analysis device configured to determine a security mode based on the video image frames;

a security module configured to, based on the security mode, restrict a display of security data through the display device; and a security state determiner configured to determine the security mode of the terminal device based on a plurality of analysis results, wherein the image analysis device comprises:

an image converter configured to generate target image frames based on the video image frames; and a plurality of image analyzers respectively comprising a plurality of image analysis models and configured to: generate the plurality of analysis results by analyzing the target image frames respectively using the plurality of image analysis models different from each other, and perform a respective analysis scheduling independently regardless of analysis execution states of other image analyzers, wherein at least one image analyzer of the plurality of image analyzers is further configured to omit an analysis of a target image frame that is received from the image converter before the at least one image analyzer completes an analysis of a previous target image frame of the target image frames.

* * * * *